US007820370B2

(12) United States Patent
Busch et al.

(10) Patent No.: US 7,820,370 B2
(45) Date of Patent: Oct. 26, 2010

(54) MULTICOLOR THERMAL IMAGING METHOD AND THERMAL IMAGING MEMBER FOR USE THEREIN

(75) Inventors: Brian D. Busch, Sudbury, MA (US); Fariza B. Hasan, Waltham, MA (US); Chien Liu, Wayland, MA (US); Stephen J. Telfer, Arlington, MA (US); William T. Vetterling, Lexington, MA (US)

(73) Assignee: Zink Imaging, Inc., Bedford, MA (US)

( * ) Notice: Subject to any disclaimer, the term of this patent is extended or adjusted under 35 U.S.C. 154(b) by 140 days.

(21) Appl. No.: 11/400,734

(22) Filed: Apr. 6, 2006

(65) Prior Publication Data

US 2006/0232642 A1 Oct. 19, 2006

Related U.S. Application Data

(60) Provisional application No. 60/668,702, filed on Apr. 6, 2005, provisional application No. 60/668,800, filed on Apr. 6, 2005.

(51) Int. Cl.
*G03C 1/00* (2006.01)
*G01D 15/10* (2006.01)

(52) U.S. Cl. ........................ 430/333; 430/338; 347/172; 347/174; 347/232

(58) Field of Classification Search ................. 347/172, 347/174, 232; 430/333, 338
See application file for complete search history.

(56) References Cited

U.S. PATENT DOCUMENTS 4,039,065 A 8/1977 Seki et al.
4,284,876 A 8/1981 Ishibashi et al.
4,376,942 A 3/1983 Toth et al.
4,748,455 A 5/1988 Mori et al.
5,172,130 A 12/1992 Takahashi et al.
5,191,357 A 3/1993 Ono et al.

(Continued)

FOREIGN PATENT DOCUMENTS

JP 59-194886 * 11/1984

(Continued)

OTHER PUBLICATIONS

PCT International Search Report—(PCT/US06/13293) Date of Mailing Jul. 30, 2008.

(Continued)

*Primary Examiner*—Thorl Chea
(74) *Attorney, Agent, or Firm*—Foley & Lardner LLP; James F. Ewing; Michel Morency

(57) ABSTRACT

A multicolor direct thermal imaging method and an imaging member for use therein, wherein a multicolor image is formed in a thermal imaging member having at least two different image-forming compositions capable of forming two different colors. Heat is used to form an image in the first color at a first speed of travel of the thermal imaging member with respect to the source of heat, and heat is used to form an image in the second color at a second speed of travel of the thermal imaging member with respect to the source of heat, where the first speed of travel and the second speed of travel are different from each other.

40 Claims, 10 Drawing Sheets

U.S. PATENT DOCUMENTS

| | | | | |
|---|---|---|---|---|
| 5,319,392 | A | 6/1994 | Durst et al. | |
| 5,327,165 | A | 7/1994 | Elliott et al. | |
| 5,398,050 | A | 3/1995 | Sato | |
| 5,451,988 | A | 9/1995 | Ono et al. | |
| 5,453,776 | A | 9/1995 | Gunther et al. | |
| 5,529,408 | A | 6/1996 | Moriguchi et al. | |
| 5,610,649 | A | 3/1997 | Kokubo et al. | |
| 5,680,168 | A | 10/1997 | Kokubo et al. | |
| 5,699,100 | A | 12/1997 | Fukuda et al. | |
| 5,815,191 | A | 9/1998 | Michielsen et al. | |
| 6,037,961 | A * | 3/2000 | Saito et al. | 347/185 |
| 6,078,343 | A | 6/2000 | Jordan | |
| 6,108,017 | A | 8/2000 | Katakura et al. | |
| 6,146,031 | A | 11/2000 | Hu et al. | |
| 6,222,572 | B1 | 4/2001 | Kurachi et al. | |
| 6,444,959 | B1 | 9/2002 | Itoh et al. | |
| 6,447,181 | B1 | 9/2002 | Hagstrom et al. | |
| 6,532,032 | B2 | 3/2003 | Dunham et al. | |
| 6,598,950 | B1 | 7/2003 | Hosono et al. | |
| 6,731,318 | B2 | 5/2004 | Aigner et al. | |
| 6,744,455 | B2 | 6/2004 | Coons et al. | |
| 6,801,233 | B2 * | 10/2004 | Bhatt et al. | 347/175 |
| 7,008,759 | B2 * | 3/2006 | Cheon et al. | 430/332 |
| 2004/0170932 | A1 * | 9/2004 | Hardin et al. | 430/335 |
| 2004/0171817 | A1 * | 9/2004 | Allen et al. | 534/653 |
| 2004/0176248 | A1 * | 9/2004 | Chu et al. | 503/204 |
| 2004/0204317 | A1 * | 10/2004 | Cheon et al. | 503/218 |

FOREIGN PATENT DOCUMENTS

| | | |
|---|---|---|
| JP | 05-220990 | 8/1993 |
| WO | WO 02/096665 | 12/2002 |

OTHER PUBLICATIONS

PCT International Search Report—(PCT/US06/13294) Date of Mailing Jul. 30, 2008.

English Patent Abstract of Japanese Laid-Open Publication No. 05-220990, Date of Publication: Aug. 31, 1993.

* cited by examiner

MULTICOLOR THERMAL IMAGING METHOD AND THERMAL IMAGING MEMBER FOR USE THEREIN

REFERENCE TO RELATED APPLICATIONS

This application claims the benefit of prior provisional patent applications Ser. Nos. 60/668,702 and 60/668,800, both filed Apr. 6, 2005, the contents of which are incorporated by reference herein in their entireties.

This application is related to the following commonly assigned, United States patent applications and patents, the entire disclosures of which are hereby incorporated by reference herein in their entirety:

U.S. Pat. No. 6,801,233 B2;

U.S. Pat. No. 6,906,735 B2;

U.S. Pat. No. 6,951,952 B2;

U.S. Pat. No. 7,008,759 B2;

U.S. patent application Ser. No. 10/806,749, filed Mar. 23, 2004, which is a division of U.S. Pat. No. 6,801,233 B2;

United States Patent Application Publication No. US2004/0176248 A1;

United States Patent Application Publication No. US2004/0204317 A1;

United States Patent Application Publication No. US2004/0171817 A1; and

U.S. patent application Ser.No. 11/400,735, filed on even date herewith, now issued as U.S. Pat. No. 7,408,563.

FIELD OF THE INVENTION

The present invention relates generally to a direct thermal imaging method and, more particularly, to a multicolor direct thermal imaging method and member for use therein, wherein a direct thermal imaging member comprising different image-forming compositions is imaged at different speeds by a source of heat to form a multicolored image.

BACKGROUND OF THE INVENTION

Direct thermal imaging is a technique in which a substrate bearing at least one image-forming layer, which is typically initially colorless, is heated by contact with a thermal printing head to form an image. In direct thermal imaging there is no need for ink, toner, or thermal transfer ribbon. Rather, the chemistry required to form an image is present in the imaging member itself. Direct thermal imaging is commonly used to make black and white images, and is often employed for the printing of, for example, labels and store receipts. There have been described in the prior art numerous attempts to achieve multicolor direct thermal printing. A discussion of various direct thermal color imaging methods is provided in U.S. Pat. No. 6,801,233 B2.

In the method of the present invention, a direct thermal imaging member having more than one image-forming layer is addressed by a thermal printing head to provide a colored image. The imaging member is addressed in more than one pass of a thermal printing head, at least one pass being at a different speed from at least another pass. Optionally, the imaging member is preheated to a different extent in at least one pass than in at least another pass.

In U.S. Pat. No. 6,801,233 B2 there is described and claimed a direct thermal imaging system in which one or more thermal printing heads can form two colors in a single pass on the imaging member. The printer can form these multiple colors by addressing two or more image-forming layers of the imaging member at least partially independently from the same surface so that each color can be formed alone or in selectable proportion with the other color(s). In a preferred embodiment, a printer can form three colors on three image-forming layers which may be carried by the same surface of a substrate.

Thermal printing devices with variable printing speed are known in the art, as described, for example, in U.S. Pat. Nos. 5,319,392 and 6,078,343. These can be direct thermal or thermal transfer printers. In general, the speed of thermal printers depends upon the nature of the image to be printed. Thus, low-quality direct thermal images (such as store receipts) may be printed at speeds of 3 inches/second or more. Thermal transfer printing of photographic quality is typically carried out at speeds of less than 1 inch/second.

Preheating of a thermally activated printing head is described, for example, in U.S. Pat. No. 5,191,357 which describes a recording apparatus for performing recording on a recording medium where the apparatus includes a plurality of recording elements and a control unit for selectively providing energy having a level lower than an actual recording level. It is also known to preheat a thermal transfer ink layer in a thermal transfer imaging method. For example, U.S. Pat. No. 5,529,408 discloses a thermal transfer recording method wherein the thermal transfer ink layer is preheated prior to having energy applied thereto in order to initiate transfer of the ink to a receiving material.

As the state of the thermal imaging art advances, efforts continue to be made to provide thermal imaging materials and thermal imaging methods that can meet new performance requirements.

SUMMARY OF THE INVENTION

It is therefore an object of this invention to provide a novel, multicolor, direct thermal imaging method.

It is another object to provide a multicolor direct thermal imaging method wherein at least two, and preferably three, different image-forming compositions are addressed by heating to form a multicolored image.

It is a further object of the invention to provide a multicolor direct thermal imaging method that is practiced with a thermal imaging member having at least two, and preferably three, different image-forming layers. Preferably, these image-forming layers are carried by the same surface of a substrate.

Yet another object is to provide such a multicolor direct thermal imaging method wherein at least two, and preferably three, different image-forming layers of an imaging member are heated directly or indirectly when heat is applied to a particular layer of the thermal imaging member. In a preferred embodiment, heat is applied to layer closest to the surface of the imaging member using at least one thermal printing head.

Hereinafter, when a particular image-forming layer is described as being heated, or when heat is described as being applied to a particular image-forming layer, it is to be understood that such heating may be direct heating (by, for instance, contact with a hot object or by absorption of light and conversion to heat in the layer itself) or indirect heating (in which a neighboring region or layer of the thermal imaging member is directly heated, and the particular layer considered is heated by diffusion of heat from the directly heated region).

It is a further object to provide a multicolor direct thermal imaging method wherein heat is applied to the image-forming compositions in more than one pass of a source of heat that is in relative motion with respect to the thermal imaging member.

Another object is to provide a multicolor direct thermal imaging method wherein an image is formed in a thermal imaging member comprising at least a first image-forming composition forming a first color when heated and a second image-forming composition forming a second color when heated, said first and second colors being different from each other. In a preferred method, heat is used to form an image in the first color at a first speed of travel of the thermal imaging member with respect to the source of heat, and heat is used to form an image in the second color at a second speed of travel of the thermal imaging member with respect to the source of heat, where the first speed of travel and the second speed of travel are substantially different speeds of travel.

The limitation "substantially different speeds of travel", as used herein, is satisfied when one speed of travel differs from another by at least about 20%.

In another preferred embodiment of the invention the method is carried out with a thermal imaging member that includes three different image-forming compositions. According to this embodiment of the method, heat is used to form an image in the first color at a first speed of travel of the thermal imaging member with respect to the source of heat, heat is used to form an image in the second color at a second speed of travel of the thermal imaging member with respect to the source of heat, and heat is used to form an image in the third color at a third speed of travel of the thermal imaging member with respect to the source of heat. In one preferred embodiment, the first, second and third speeds of travel are all substantially different speeds of travel. In another preferred embodiment, an image is formed in two of the colors in a first pass at a first speed of travel, and an image is formed in at least a third color at a second speed of travel, where the first and second speeds of travel are substantially different speeds of travel.

There is also provided a thermal imaging member for use in the preferred methods.

BRIEF DESCRIPTION OF THE DRAWINGS

For a better understanding of the invention as well as other objects and advantages and further features thereof, reference is made to the following detailed description of various preferred embodiments thereof taken in conjunction with the accompanying drawings wherein.

DESCRIPTION OF THE PREFERRED EMBODIMENTS

Figure 1:
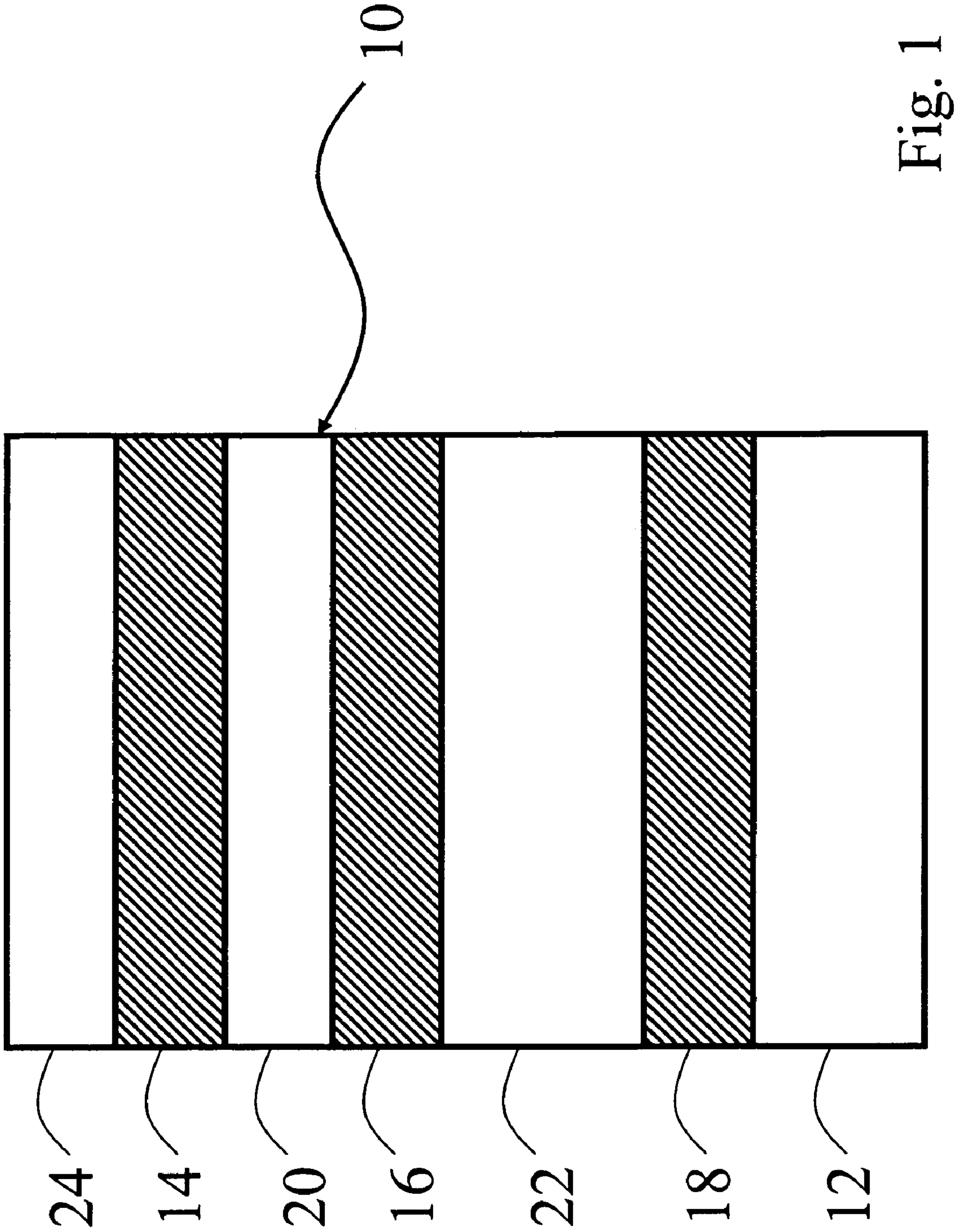
FIG. 1 is a partially schematic, side sectional view of a multicolor thermal imaging member which can be utilized in the method of the invention.

Specific preferred embodiments of the invention will be described with respect to the drawings, which illustrate thermal imaging members for use with the present thermal imaging method. Referring now to FIG. 1, there is seen a thermal imaging member 10 that includes a substrate 12, that can be transparent, absorptive, or reflective, and three image-forming layers 14, 16, and 18, which may be cyan, magenta and yellow, respectively, spacer layers 20 and 22, and an optional overcoat layer 24.

Each image-forming layer can change color, e.g., from initially colorless to colored, where it is heated to a particular temperature referred to herein as its activating temperature. Any order of the colors of the image-forming layers can be chosen. One preferred color order is as described above. Another preferred order is one in which the three image-forming layers 14, 16, and 18 are yellow, magenta and cyan, respectively.

Spacer layer 20 is preferably thinner than spacer layer 22, provided that the materials comprising both layers have substantially the same thermal diffusivity. The function of the spacer layers is control of thermal diffusion within the imaging member 10. Preferably, spacer layer 22 is at least four times thicker than spacer layer 20.

All the layers disposed on the substrate 12 are substantially transparent before color formation. When the substrate 12 is reflective (e.g., white), the colored image formed on imaging member 10 is viewed through the overcoat 24 against the reflecting background provided by the substrate 12. The transparency of the layers disposed on the substrate ensures that combinations of the colors printed in each of the image-forming layers may be viewed.

In the preferred embodiments of the invention where the thermal imaging member includes at least three image-forming layers, all the image-forming layers may be arranged on the same side of a substrate, or two or more of the image-forming layers may be arranged on one side of a substrate with one or more image-forming layers being arranged on the opposite side of the substrate.

In preferred embodiments of the method of the invention, the image-forming layers are addressed at least partially independently by variation of two adjustable parameters, namely, temperature and time. These parameters can be adjusted in accordance with the invention to obtain the desired results in any particular instance by selecting the temperature of the thermal printing head and the period of time during which heat is applied to the thermal imaging member. Thus, each color of the multicolor imaging member can be printed alone or in selectable proportion with the other colors. As will be described in detail, in these embodiments the temperature-time domain is divided into regions corresponding to the different colors that it is desired to obtain in the final image.

Depending upon the printing time, available printing power, and other factors, various degrees of independence in the addressing of the image-forming layers can be achieved. The term "independently" is used to refer to instances in which the printing of one color-forming layer typically results in a very small, but not generally visible optical density (density< 0.05) in the other color-forming layer(s). In the same manner, the term "substantially independent" color printing is used to refer to instances in which inadvertent or unintentional coloration of another image-forming layer or layers results in a visible density which is at a level typical of interimage coloration in multicolor photography (density<0.2). The term "partially independent" addressing of the image-forming layers is used to refer to instances in which the printing of maximum density in the layer being addressed results in the coloration of another image-forming layer or layers at a density higher than 0.2 but not higher than about 1.0. The phrase "at least partially independently" is inclusive of all of the degrees of independence described above.

The image-forming layers of the thermal imaging member undergo a change in color to provide the desired image in the imaging member. The change in color may be from colorless to colored, from colored to colorless, or from one color to another. The term "image-forming layer" as used throughout the application, including in the claims, includes all such embodiments. In the case where the change in color is from colorless to colored, an image having different levels of optical density (i.e., different "gray levels") of that color may be obtained by varying the amount of color in each pixel of the image from a minimum density, Dmin, which is substantially colorless, to a maximum density, Dmax, in which the maximum amount of color is formed. In the case where the change in color is from colored to colorless, different gray levels are obtained by reducing the amount of color in a given pixel from Dmax to Dmin, where ideally Dmin is substantially colorless.

According to a preferred embodiment of the invention, each of the image-forming layers 14, 16 and 18 is independently addressed by application of heat with a thermal printing head in contact with the topmost layer of the member, optional overcoat layer 24 in the member illustrated in FIG. 1. The activating temperature ($Ta_3$) of the third image-forming layer 14 (as counted from the substrate 12, i.e., the image-forming layer closest to the surface of the thermal imaging member) is greater than the activating temperature ($Ta_2$) of the second image-forming layer 16, which in turn is greater than the activating temperature ($Ta_1$) of the first image-forming layer 18. Delays in heating of image-forming layers at greater distances from the thermal printing head are provided by the time required for heat to diffuse to these layers through the spacer layers. Such delays in heating permit the image-forming layers closer to the thermal printing head to be heated to above their activating temperatures without activating the image-forming layer or layers below them even though these activating temperatures can be substantially higher than the activating temperatures for the lower image-forming layers (those that are farther away from the thermal printing head). Thus, when addressing the uppermost image-forming layer 14 the thermal printing head is heated to a relatively high temperature, but for a short time, such that insufficient heat is transferred to the other image-forming layers of the imaging member to provide image information to either of image-forming layers 16 and 18.

The heating of the lower image-forming layers, i.e., those closer to the substrate 12 (in this case image-forming layers 16 and 18) is accomplished by maintaining the thermal printing head at temperatures such that the upper image-forming layer(s) remain below their activating temperatures for sufficient periods of time to allow heat to diffuse through them to reach the lower image-forming layer(s). In this way, no image information is provided in the upper image-forming layer(s) when the lower image-forming layer(s) are being imaged. The heating of the image-forming layers according to the method of the invention may be accomplished by two passes of a single thermal printing head, or by a single pass of each of more than one thermal printing head, as is described in detail below.

Although the heating of imaging member 10 is preferably carried out using a thermal printing head, any method providing controlled heating of the thermal imaging member may be used in the practice of the present invention. For example, a modulated source of light (such as a laser) may be used. In this case, as is well known in the art, an absorber for light of a wavelength emitted by the laser must be provided in the thermal imaging member or in contact with the surface of the imaging member.

When a thermal printing head (or other contact heating element) is used to heat the thermal imaging member 10, heat diffuses into the bulk of the thermal imaging member from the layer in contact with the thermal printing head (typically, overcoat layer 24). When a source of light is used for heating, the layer or layers containing an absorber for the light will be heated as light is converted to heat in these layers, and heat will diffuse from these layers throughout the thermal imaging member. It is not necessary that the light-absorbing layers be at the surface of the imaging member, provided that the layers of the thermal imaging member separating the source of light from the absorbing layers are transparent to light of the wavelength to be absorbed. In the discussion below it is assumed that the layer that is directly heated is the overcoat layer 24, and that heat diffuses from this layer into the thermal imaging member, but similar arguments apply whichever layer or layers of the thermal imaging member 10 is (or are) heated.

Figure 2:
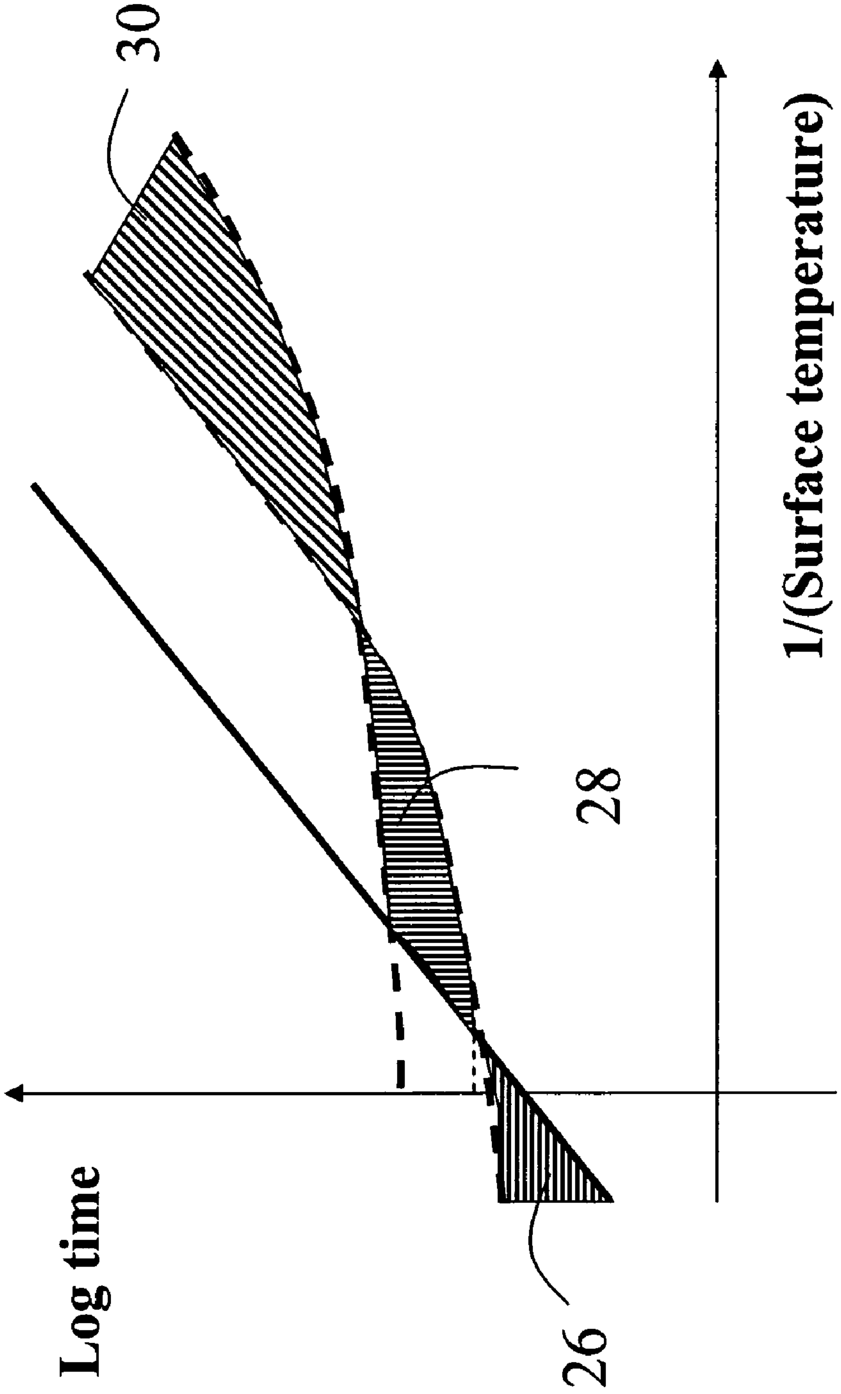
FIG. 2 is a graphical illustration showing the relative times and temperatures of heating required to address the separate colors of a multicolor thermal imaging member.

FIG. 2 is a graphical illustration showing the thermal printing head temperatures and times of heating required to address image-forming layers 14, 16 and 18, assuming that these layers are all initially at ambient temperature. The axes of the graph in FIG. 2 show the logarithm of the heating time and the reciprocal of the absolute temperature at the surface of the imaging member 10 that is in contact with the thermal printing head. Region 26 (relatively high printing head temperature and relatively short heating time) provides imaging of image-forming layer 14, region 28 (intermediate printing head temperature and intermediate heating time) provides imaging of image-forming layer 16 and region 30 (relatively low printing head temperature and relatively long heating time) provides imaging of image-forming layer 18. The time required for imaging image-forming layer 18 is substantially longer than the time required for imaging image-forming layer 14.

The activating temperatures selected for the image-forming layers are generally in the range of about 90° C. to about 300° C. The activating temperature ($Ta_1$) of the first image-forming layer 18 is preferably as low as possible consistent with thermal stability of the imaging member during shipment and storage and preferably is about 100° C. or more. The activating temperature ($Ta_3$) of the third image-forming layer 14 is preferably as low as possible consistent with allowing the activation of the second and third image-forming layers 16 and 18 by heating through this layer without activating it according to the method of the invention, and preferably is about 200° C. or more. The activating temperature ($Ta_2$) of the second image-forming layer is between $Ta_1$ and $Ta_3$ and is preferably between about 140° C. and about 180° C.

In applications where stability is less important the activating temperature, $Ta_1$, of the first image-forming layer may be as low as about 70° C., the activation temperature of the second image-forming layer, $Ta_2$, is preferably at least about 30° C. above $Ta_1$, and the activating temperature of the third image-forming layer, $Ta_2$, is preferably at least about 30° C. above $Ta_2$.

Thermal printing heads used in the method of the present invention typically include a substantially linear array of resistors that extends across the entire width of the image to be printed. In some embodiments the width of the thermal printing head may be less than that of the image. In such cases the thermal printing head may be translated relative to the thermal imaging member in order to address the entire width of the image, or else more than one thermal printing head may be used. The imaging member is typically imaged while being transported in a direction perpendicular to the line of resistors on the printing head while pulses of heat are provided by supplying electrical current to these resistors. The time period during which heat can be applied to thermal imaging member 10 by a thermal printing head is typically in the range of about 0.001 to about 100 milliseconds per line of the image. The lower limit may be defined by the constraints of the electronic circuitry, while the upper limit is set by the need to print an image in a reasonable length of time. The spacing of the dots that make up the image is generally in the range of 100-600 lines per inch in directions both parallel and transverse to the direction of motion, and is not necessarily the same in each of these directions.

In forming an image using imaging member 10, the thermal printing head may be in contact with the thermal imaging member in a single pass over the surface of the image, and print all three colors in that single pass. There are, however, situations in which the printing is preferably carried out in more than one pass of the thermal printing head. In such cases, two of the image-forming layers may be printed in one pass, and a third in a second pass. Alternatively, three image-forming layers may be printed in three separate passes. One obvious consequence to printing in more than one pass is that the length of time required to obtain an image can be longer than if the image were printed in a single pass. It is an object of the present invention to minimize the time taken to print imaging members such as that illustrated in FIG. 1 in more than one pass of a thermal printing head.

It is apparent from FIG. 2 that the time of heating required for image-forming layer 14 is less than that required for image-forming layer 16, which in turn is less that that required for image-forming layer 18. When the imaging member is printed in more than one pass of a thermal printing head, therefore, the pass in which image-forming layer 14 is printed should ideally be faster than that in which image-forming layer 18 is printed. In the case that the imaging member is printed in three passes, the order of printing speeds should be layer 14>layer 16>layer 18.

One reason that more than one printing pass may be required is that it may be desirable to preheat the thermal imaging member to a different temperature in one pass than in another. Such selectable preheating allows a greater flexibility in the printing method, and more controlled addressing of the individual image-forming layers.

Figure 3:
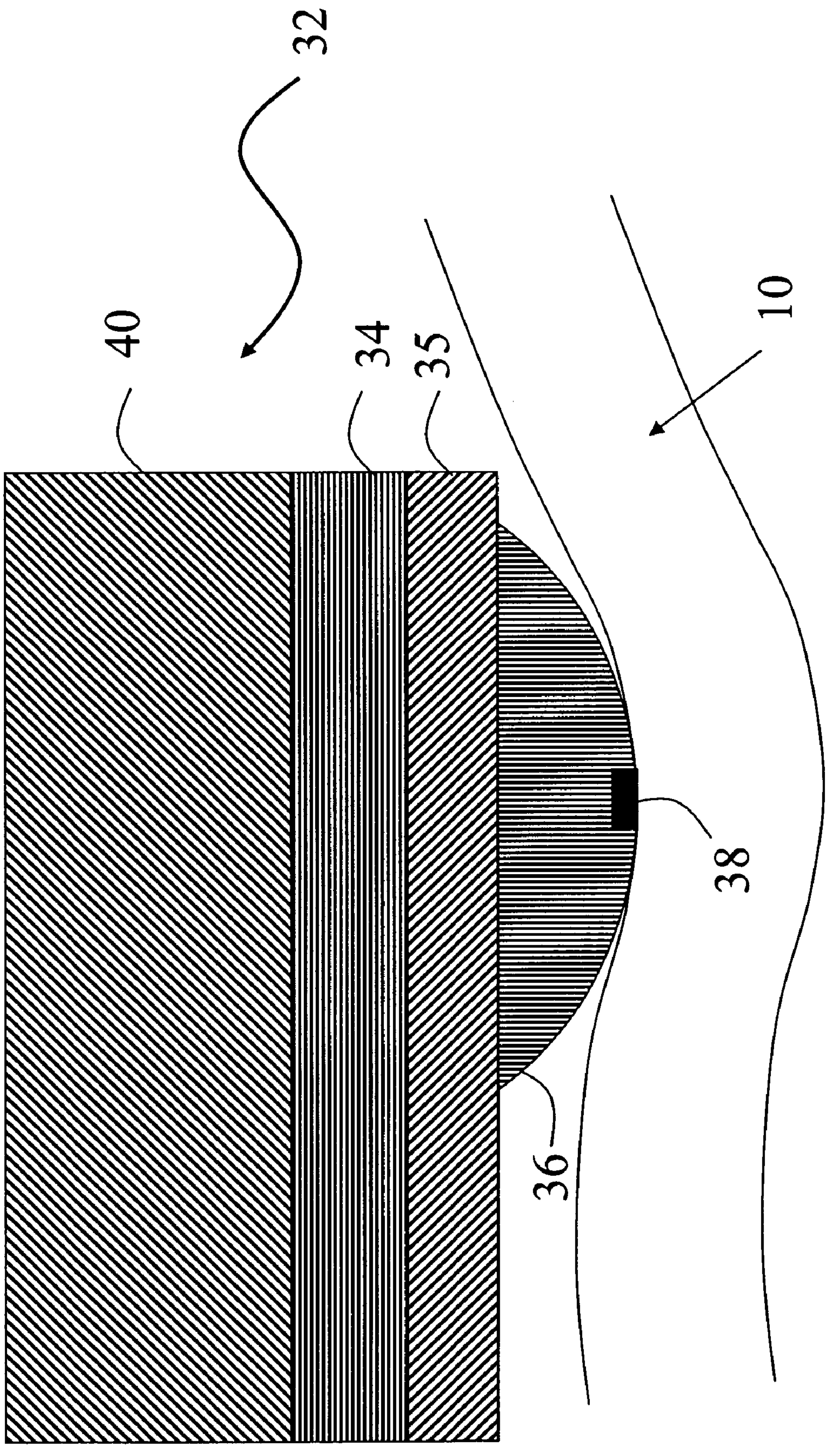
FIG. 3 is a schematic, side sectional view of a thermal printing head in contact with a multicolor thermal imaging member.

FIG. 3 shows in schematic form the area of contact between a typical thermal printing head and the thermal imaging member. The thermal printing head 32 comprises a substrate 34 on which is located a glaze element 35. Optionally, glaze element 35 also comprises a "glaze bump" 36 whose curved surface protrudes from the surface of glaze 35. The resistors 38 are located on the surface of this glaze bump 36, when it is present, or are located on the surface of the flat glaze element 35. An overcoat layer or layers may be deposited over the resistors 38, glaze element 35, and optional glaze bump 36. The combination of glaze element 35 and optional glaze bump 36, both of which which are typically composed of the same material, is hereinafter referred to as the "printing head glaze". In thermal contact with substrate 34 is a heat sink 40, which is typically cooled in some manner (for example, by use of a fan). The thermal imaging member 10 may be in thermal contact with the printing head glaze (typically through the overcoat layer or layers) over a length substantially greater than the length of the actual heating resistor. Thus, a typical resistor may extend about 120 microns in the direction of transport of the thermal imaging medium 10, but the area of thermal contact of the thermal imaging member with the printing head glaze may be 200 microns or more.

During the formation of an image, a substantial amount of heat is transferred from the resistors 38 into the printing head glaze, and the temperature of the printing head glaze may rise. Depending upon the speed of printing and the precise area of contact between the thermal imaging member and the printing head glaze, the temperature of the thermal imaging member 10 at the moment of contact with the resistors 38 may not be ambient temperature. Moreover, there may be a gradient of temperature within the thermal imaging member 10 such that the temperatures within each of the image-forming layers are not the same.

The temperature of an image-forming layer at the moment that the thermal imaging member begins to be heated by the resistors 38 (or other modulated source of heat adapted to form an image in the thermal imaging member) is herein referred to as the "baseline temperature" of that layer. Where a gradient of temperatures exists within the image-forming layer at the time that modulated heating of the thermal imaging member to form an image in the thermal imaging member begins, the baseline temperature of the layer, as that term is used herein, includes the range of temperatures within the gradient. Thus, it should be understood that the term "baseline temperature" is inclusive of a range of temperatures that may be present in different areas of the layer.

Any heating that causes the baseline temperature of an image-forming layer to be greater than ambient temperature is herein referred to as "preheating". Preheating may be effected by thermal contact of the thermal imaging member with the printing head glaze as described above, or by contact with other preheating means as described in more detail below.

Figure 4:
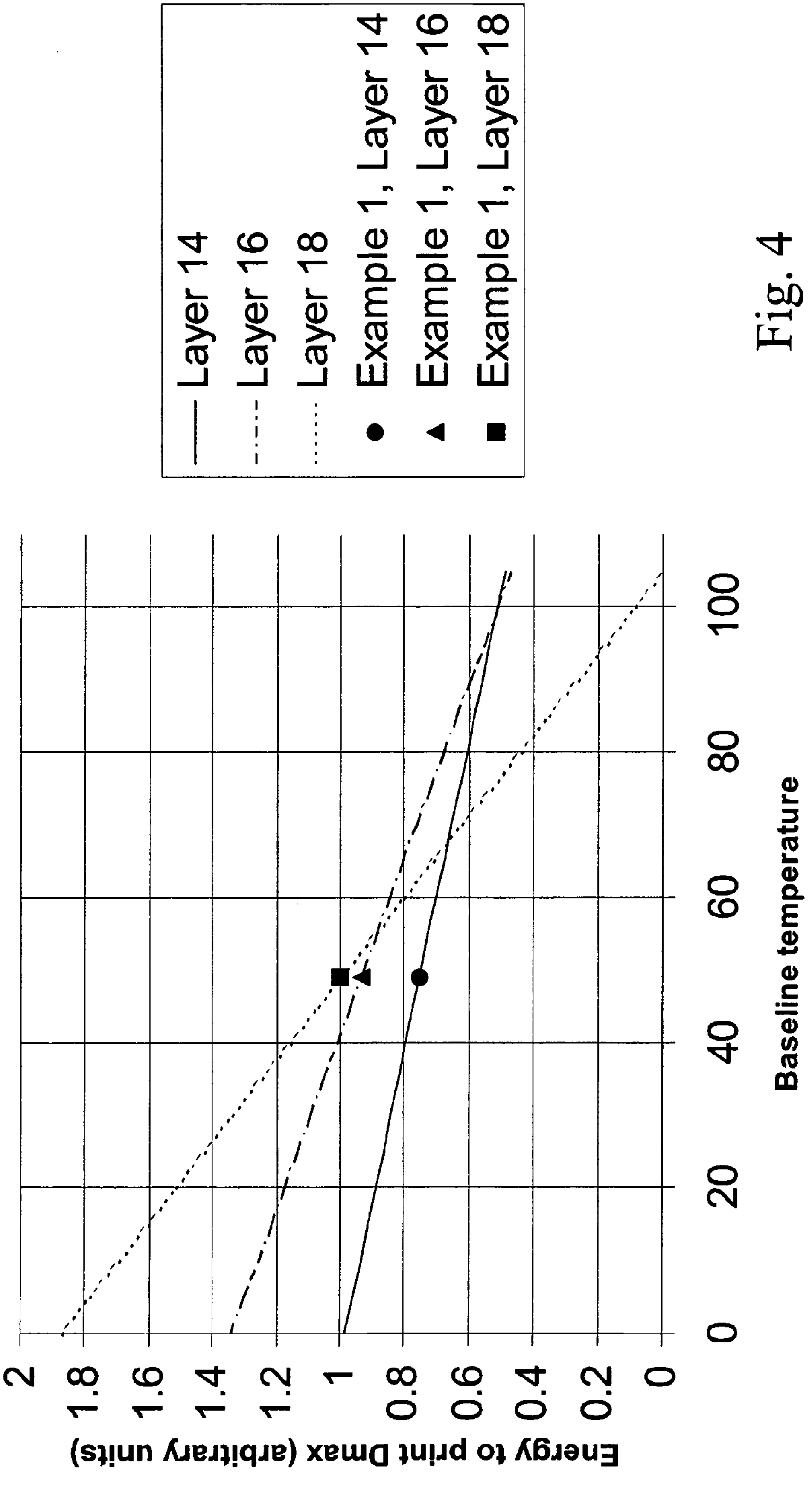
FIG. 4 is a graphical illustration of a rough approximation of the effect of the baseline temperature on the heat required to provide image information to the separate image-forming layers of the multicolor thermal imaging member.

The analysis of time and temperature regions for printing each image-forming layer given above with reference to FIG. 2 carried the assumption that the baseline temperatures for all three image-forming layers of the imaging system were the same, namely ambient temperature. However, the energy required to heat a particular image-forming layer to its activating temperature will depend upon the difference between its activating temperature and its baseline temperature. FIG. 4 shows the relative energies required to print maximum density in each of the image-forming layers according to the method described in Example 1 below, in which the baseline temperatures for the three layers are each 49° C., and the activation temperatures for layers 14, 16 and 18 are 210° C., 161° C., and 105° C., respectively. Also shown in FIG. 4 are lines showing how, according to a simplified model, the energies required to reach Dmax in the three image-forming layers would change with changes in the baseline temperatures of those layers. The assumption made in construction of the chart shown in FIG. 4 is that the amount of energy required to reach Dmax in a particular layer changes linearly with the change in its baseline temperature. Each line intercepts the baseline temperature axis at the activation temperature for that particular image-forming layer, since this is the temperature at which no additional energy would be required to form full density in that layer. As can be seen from FIG. 4, as the baseline temperature of an image-forming layer is raised, the relative change in the amount of heat that must be supplied by the thermal printing head in order to activate it will be greater for image-forming layers with lower activating temperatures.

For example, referring now to FIG. 4, at baseline temperatures of 20° C. for image-forming layers 14 and 18, about 1.7 times more energy needs to be supplied to reach maximum density (Dmax) in layer 18 than must be supplied to image-forming layer 14 to reach Dmax in that layer. At baseline temperatures for these layers of about 68° C., however, about the same amount of energy needs to be supplied to reach Dmax in layer 18 as needs to be supplied to accomplish the same result for layer 14. Above this temperature, less energy needs to be supplied to reach Dmax in layer 18 than must be supplied to accomplish the same result for layer 14, and it becomes impossible to reach Dmax in layer 14 without also reaching Dmax in layer 18. The practice of the present invention therefore involves control of the baseline temperatures of the image-forming layers.

It will be apparent to one of skill in the art that a given baseline temperature for a particular image-forming layer may be obtained in a variety of different ways, which may result in different gradients of temperature within the imaging member. These gradients, moreover, will change over time. It is also possible that a gradient of temperature may exist across the image-forming layer itself. For these reasons, the analysis given above with reference to FIG. 4 is to be regarded as a simplification that is presented as an aid to the understanding of the present invention, and is not intended to limit the invention in any way.

As described above, the rate-limiting layer for forming an image in the thermal imaging member according to the method of the present invention is the most deeply buried image-forming layer, image-forming layer 18 in the imaging member illustrated in FIG. 1. At a baseline temperature of ambient temperature, forming an image in image-forming layer 18 without forming an image in image-forming layer 16 requires a relatively long time for heat diffusion, since a large amount of heat must be transferred into the member at the relatively low temperature that will not provide image information to image-forming layer 16. Referring to FIG. 4, it is seen that the energy that must be supplied to provide image information to image-forming layer 18 is the most significantly affected by a change in baseline temperature. Therefore, according to a preferred embodiment of the present invention, heat is applied to image-forming layers 14 and 16 by a thermal printing head (not necessarily at the same time) while image-forming layer 18 is at a first baseline temperature $T_1$ in a first printing pass, and heat is subsequently applied to image-forming layer 18 in a second printing pass while image-forming layer 18 is at a second baseline temperature $T_2$ which is greater than the first baseline temperature $T_1$ and below the activating temperature of image-forming layer 18. The first baseline temperature, $T_1$, is preferably about ambient temperature, i.e., from about 10° C. to about 30° C. The second baseline temperature is preferably substantially above ambient temperature. The upper limit of the second baseline temperature is defined by the operating temperature range of the thermal printing head and the activating temperature of the image-forming layer 18. A preferred range for temperature $T_2$ is from about 30° C. to about 80° C., and a particularly preferred temperature value of $T_2$ is between about 40° C. and about 70° C.

The baseline temperature of any of the image-forming layers within the thermal imaging member as an image is formed therein may be adjusted by a variety of techniques that will be apparent to those skilled in the art. For example, as shown in FIG. 3, the baseline temperature of the thermal imaging member may be affected by thermal contact with the printing head glaze prior to heating by the heating element. The temperature of the printing head glaze may be adjusted in a variety of well-known ways. As described above in FIG. 3, the printing head glaze is typically in indirect thermal contact with a heat sink 40 that may be heated or cooled. Heating may be accomplished by separate resistive heating, by use of a heating fluid, by irradiation (using for example visible light, ultraviolet, infrared, or microwave radiation), by friction, by hot air, by use of the thermal printing head heating elements 38 themselves, or by any convenient method that would be well-known to one skilled in the art. The heat sink may be cooled by a variety of well-known methods that include the use of fans, cold air, cooling liquid, thermoelectric cooling, and the like. Closed-loop control of the temperature of the heat sink may be achieved by measuring its temperature, for example by using a thermistor and applying heating or cooling as necessary to maintain a constant value, as is well known in the art.

Figure 5:
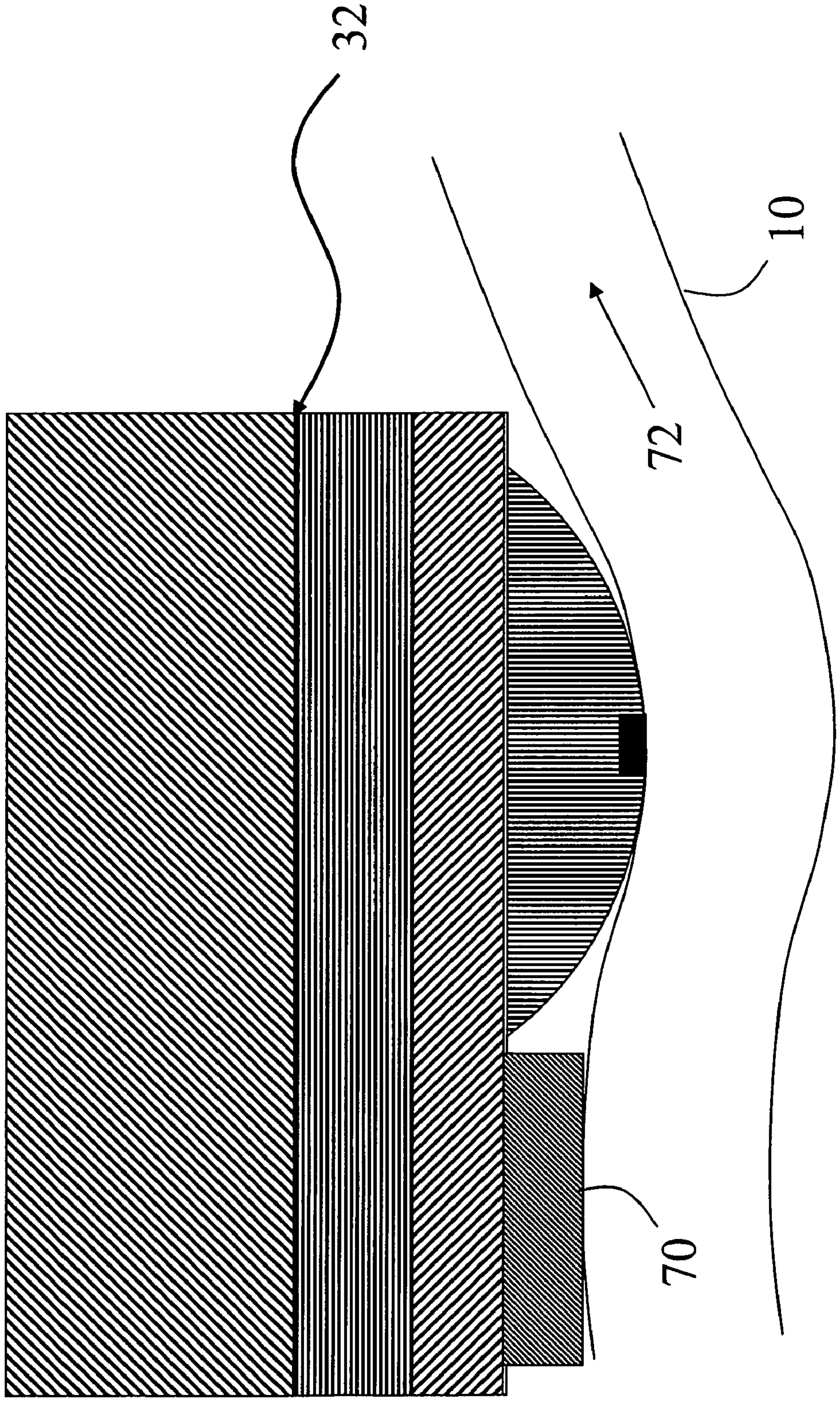
FIG. 5 is a schematic, side sectional view of a preheating element in conjunction with a thermal printing head in contact with a multicolor thermal imaging member.

Other techniques may be used to adjust the baseline temperature of the image-forming layers of the thermal imaging member during image formation. FIG. 5 shows an example of one such way to accomplish this result. Referring now to FIG. 5, there is seen preheating element 70 that is arranged to contact and heat the thermal imaging member 10 prior to its encounter with the resistors of the printing head. Arrow 72 indicates the direction of motion of the thermal imaging member. Forming an image in image-forming layer 18 is carried out when that layer is at baseline temperature $T_2$ as defined above. Preheating element 70 is therefore in place during the printing pass in which image-forming layer 18 undergoes image formation. Image-forming layers 14 and 16 are imaged while image-forming layer 18 is at baseline temperature $T_1$ without preheating element 70 in place. In cases where more than one printing head is used, one printing head may be equipped with preheating element 70, and used to form an image in image-forming layer 18, while another printing head, without a preheating element, can be used to form an image in image-forming layers 14 and 16. These thermal printing heads could print in either order, but it is preferred that the thermal printing head without preheating encounter the thermal imaging member first. Where a single printing head is employed, preheating element 70 can be moved so as not to contact thermal imaging member 10 during the printing pass in which image-forming layers 14 and 16 are imaged. Alternatively, an imaging member can be translated in the opposite direction to that shown by the arrow 72, so that preheating element 70 comes into contact with the thermal imaging member only after printing has taken place.

Any suitable heat-providing member may be used to preheat the thermal imaging member according to the method of the invention. The preheating element may be a thermally conductive shim that is in thermal contact with the heat sink of a thermal printing head and provides additional area of contact with a thermal imaging member. In some cases, this shim may also serve as the cover for the integrated circuits that supply current to the heating elements of the thermal printing head, or it may be a part of the heat sink of the thermal printing head. Alternatively, the preheating element may include a separate resistive heater, a conduit for a heating fluid, a source of radiation (for example, infra-red radiation), a frictional contact, or other heating means such as are well known to those of skill in the art.

Although FIG. 5 shows preheating of the same surface of the imaging member that is addressed by the thermal printing head, it will be appreciated that the imaging member could be preheated from the surface opposed to that which is addressed by the thermal printing head. Preheating of both surfaces of the imaging member is also possible.

As discussed above, according to a preferred embodiment of the present invention, the first and second applications of heat to the image-forming layers are carried out at different speeds of the imaging member relative to the source of heat used to form the image. In one such step at least a first image-forming layer is at a first baseline temperature when heat is applied to at least a second image-forming layer to form an image therein. Heat is applied to the first image-forming layer to form an image therein when it is at a second baseline temperature. Preheating is used to make the adjustment in the baseline temperature of the first image-forming layer.

The amount of preheating of a particular image-forming layer within the thermal imaging member may itself be affected by the printing speed. As discussed above, preheating may be effected by the printing head glaze of FIG. 3, or by a separate preheating means such as element 70 of FIG. 5. In either case, whether or not the baseline temperatures of the image-forming layers of the imaging member are significantly altered by encounter of the imaging member with the preheating element depends upon for how long the member encounters the preheating element, and this depends upon the length of encounter between the two in the direction of transport and the speed of transport. In some cases, there may be a distance separating the print line 38 of FIG. 3 from the preheating element (e.g., element 70 of FIG. 5), and during the traverse of this distance heat transferred to the imaging member by the preheating element may diffuse throughout the thermal imaging member. The amount of such diffusion will depend upon the speed of transport of the imaging member.

It is likely, moreover, that a gradient of temperature will be established within the imaging member by its encounter with the preheating element, such that the degree of preheating of a particular image-forming layer will depend also upon the distance separating the particular layer from the preheating element. This is particularly true when the preheating element is a hot object that makes physical contact with the surface of the imaging member.

If two passes of a thermal printing head are used to form an image in an imaging member such as that shown in FIG. 1, and physical contact of a surface of the imaging member with a preheating element is used to adjust the baseline temperature of particular image-forming layer such that it is different for each pass, the degree of control required of the preheating element depends upon whether or not the two passes are of the same speed. When the two printing passes are of the same speed, the temperature of the preheating element, or the length of contact between the imaging member and the preheating element, must be adjusted between the two printing passes. In practice, difficulties may be encountered in achieving this result. Where, however, the two printing passes are not carried out at the same speed, it may not be necessary to adjust the temperature of the preheating element or the length of contact between it and the imaging member. This is because a first printing pass can be at a low speed such that there is sufficient time for the imaging medium to equilibrate to the temperature of the preheating element to a depth that substantially includes the particular image-forming layer to be preheated, while a second printing pass can be at a higher speed that does not allow time for significant preheating of the particular image-forming layer.

A direct thermal imaging method wherein an image is formed in a thermal imaging member having at least two image-forming layers with more than one pass of a thermal printing head, and wherein at least one of the image-forming layers is at a first baseline temperature (T1) when heat is being applied to one or more other image-forming layers in a pass of a printing head and the baseline temperature of that image-forming layer is at a second different temperature (T2) when heat is applied to it is disclosed in co-pending commonly-assigned U.S. patent application Ser. No. 11/400,735, filed on even date herewith, now issued as U.S. Pat. No. 7,408,563.

In one preferred embodiment of the present invention, image-forming layers 14 and 16 are imaged in one printing pass while image-forming layer 18 is at a baseline temperature $T_1$ that is substantially equal to the ambient temperature, and image-forming layer 18 is imaged in a second printing pass while it is at a baseline temperature $T_2$ that is substantially above the ambient temperature.

In a particularly preferred embodiment, the preheating element is above ambient temperature and the thermal imaging medium makes contact with the preheating element over a length in the transport direction of at least about 200 microns. Image-forming layers 14 and 16 are imaged in a first pass and image-forming layer 18 is imaged in a second pass, the first pass is preferably carried out at or above a speed of about 0.7 inch/second, and especially preferably at or above a speed of about 1 inch/second, and the second printing pass in which image-forming layer 18 is imaged preferably is carried out at or below a speed of about 0.5 inches/second, and especially preferably at or below a speed of about 0.3 inches/second.

In another particularly preferred embodiment of the method of the invention, the preheating element is above ambient temperature, the thermal imaging member makes contact with the preheating element over a length in the transport direction of at least about 200 microns, and three printing passes are employed. The printing pass or passes in which image-forming layer 14 is imaged is carried out at or above a speed of about 0.7 inch/second, and especially preferably at or above a speed of about 1 inch/second, the printing pass or passes in which image-forming layer 16 is imaged is carried out at or above a speed of about 0.7 inch/second, and especially preferably at or above a speed of about 1 inch/second, and the printing pass or passes in which image-forming layer 18 is imaged is carried out at or below a speed of about 0.5 inches/second, and especially preferably at or below a speed of about 0.3 inches/second.

Although the invention has been described with reference to a thermal imaging member having three different image-forming layers, the same principles can be applied to imaging members comprising only two image-forming layers or having more than three such layers. Moreover, the components required for forming each color may be located in the same layer, but separated from each other in some way, for example by microencapsulation. All that is necessary in the practice of the present invention is that the time of heating of a particular layer of the thermal imaging member (typically the surface layer, as mentioned above) that is required for formation of a first color be shorter than the time of heating of that layer required for formation of a second color, and that the activating temperature for the first color be higher than the activating temperature for the second color.

Figure 6:
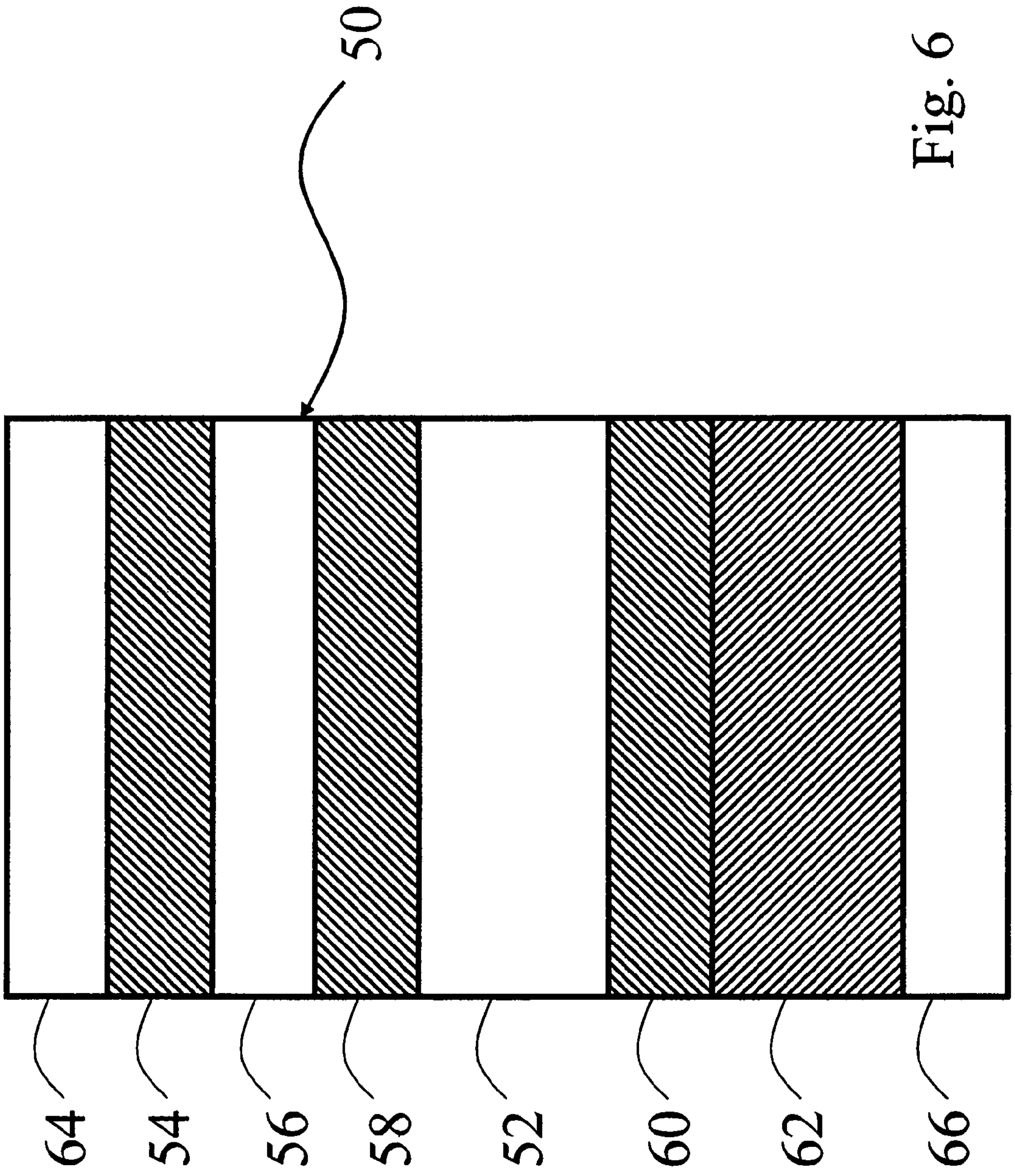
FIG. 6 is a schematic, side sectional view of another multicolor thermal imaging member which can be utilized in the method of the invention.

A thermal imaging member having two image-forming layers on one side of a transparent substrate and a third image-forming layer on the reverse side of the substrate is illustrated in FIG. 6 (not to scale). Referring now to FIG. 6 there is seen imaging member 50 which includes substrate 52, a first image-forming layer 58, spacer layer 56, a second image-forming layer 54, a third image-forming layer 60, an optional opaque (e.g., white) layer 62, an optional overcoat layer 64 and an optional backcoat layer 66. In this preferred embodiment of the invention substrate 52 is transparent. The overcoat layer, image-forming layers, spacer layer and backcoat layer may include any of the materials described below as suitable for such layers. The opaque layer 62 may comprise a pigment such as titanium dioxide in a polymeric binder, or may comprise any material providing a reflective, white coating such as would be well known to one skilled in the art.

Using the method of the present invention, formation of an image in image-forming layer 54 may be accomplished in a first pass at a first speed of travel of the imaging member 50 as described above, and formation of an image in image-forming layer 58 may be accomplished by a second printing pass at a second different speed of travel of the imaging member as described above.

Formation of an image in the third image-forming layer 60 is accomplished by printing on the reverse side of imaging member 50 with a thermal printing head, as described in U.S. Pat. No. 6,801,233 B2. This step may be performed at a speed of travel of the imaging medium which is either the first, or second or a third different speed.

In the practice of the present invention, the printing pulses supplied by the thermal printing head should be adjusted so as to compensate for the residual heat in the printing head itself and in the thermal imaging member that results from the printing of preceding (and neighboring) pixels in the image. Such thermal history compensation may be carried out as described in U.S. Pat. No. 6,819,347 B2.

It is not necessary that the yellow image be formed with as many gray levels as the images in the other two subtractive primary colors. In one embodiment of the invention, the number of gray levels used in forming yellow is deliberately made less than the number of gray levels used for the other colors. In the extreme, it is possible to use a binary image for the yellow image-forming layers (i.e., one with only Dmin and Dmax values allowed in each pixel). Even with such a small number of gray levels of the yellow sub-image, the human eye cannot easily discern a loss in the quality of the overall, three-color image. As would be well-known to one skilled in the art, dithering can be used to increase the apparent number of gray levels while trading off spatial resolution.

As described above herein, the method of the present invention can provide independent formation of each color, e.g., cyan, magenta or yellow. Thus, in this embodiment, one combination of temperature and time will permit the selection of any density of one color while not producing any noticeable amount of the other colors. Another combination of temperature and time will permit the selection of another of the three colors, and so forth. A juxtaposition of temperature-time combinations will allow the selection of any combination of the three subtractive primary colors in any relative amounts.

In other embodiments of the invention, thermal addressing of the image-forming layers, rather than being completely independent, may be substantially independent or only partially independent. Various considerations, including material properties, printing speed, energy consumption, material costs and other system requirements may dictate a system with increased lack of addressing independence, the consequence of which is color "cross-talk", i.e., the contamination of an intended color by another color. While independent or substantially independent color addressing according to the invention is important for imaging of photographic quality, this requirement may be of less importance in the formation of certain images such as, for example, labels or coupons, and in these cases may be sacrificed for economic considerations such as improved printing speed or lower costs.

In the embodiments of the invention where addressing of the separate image-forming layers of a multicolor thermal imaging member is not completely, but rather only substantially or partially independent, and by design the printing of the first color may produce a certain amount of a second color, the color gamut of the imaging member will be reduced. Since, as described above, the color gamut of the imaging member will be affected by the conditions of imaging, these conditions may be selected so as to optimize the overall system for its intended application with respect to color gamut, speed, cost, etc.

A number of image-forming techniques may be exploited in accordance with the invention including thermal diffusion with buried layers (as described in detail above), chemical diffusion or dissolution in conjunction with timing layers, melting transitions and chemical thresholds. Many such image-forming techniques have been described in detail in U.S. Pat. No. 6,801,233 B2. All such image-forming techniques may be exploited in the imaging members utilized in the method of the invention.

It should be noted here that the image-forming layers of the imaging members utilized in the method of the invention may themselves comprise two or more separate layers or phases. For example, where the image-forming material is a leuco dye that is used in conjunction with a developer material, the leuco dye and the developer material may be disposed in separate layers.

The image-forming layers of an imaging member utilized according to the invention may optionally undergo more than one color change. For example, image-forming layer 14 of imaging member 10 (FIG. 1) may go from colorless to yellow to red as a function of the amount of heat applied. Likewise, image-forming layers could start in the colored form, and be decolorized by heating. Those skilled in the art will realize that such color changes can be obtained by exploiting the imaging mechanism described in U.S. Pat. No. 3,895,173.

Any combination of materials that may be thermally induced to change color may be used in the image-forming layers. The materials may react chemically under the influence of heat, either as a result of being brought together by a physical mechanism, such as melting, or through thermal acceleration of a reaction rate. The reaction may be chemically reversible or irreversible.

The substrate for the thermal imaging member, e.g., substrate 12, may be of any suitable material for use in thermal imaging members, such as polymeric materials or treated papers, and may be transparent or reflective. The substrate may also carry layers such as adhesion-promoting layers, antistatic layers, or gas barrier layers. The face of substrate 12 opposite to that onto which is coated image-forming layer 18 may bear indicia such as a logo, or may comprise an adhesive composition such as a pressure-sensitive adhesive. Such an adhesive may be protected by a peelable liner layer. The substrate 12 may be of any practical thickness, depending upon the application, ranging from about 2 micrometers in thickness to card stock of about 500 micrometers in thickness or more.

In a preferred embodiment at least one, and preferably all the image-forming layers include as an image-providing material a chemical compound in a crystalline form, the crystalline form being capable of being converted to a liquid in the amorphous form, where the amorphous form of the chemical compound intrinsically has a different color from the crystalline form. A color thermal imaging method and thermal imaging member wherein at least one image-forming layer includes such a chemical compound are described and claimed in commonly assigned U.S. patent application Ser.

No. 10/789,648, filed Feb. 27, 2004, (United States Patent Application Publication No. US2004/0176248 A1).

The image-forming layers of the imaging members used according to the method of the invention, e.g., image-forming layers 14, 16 and 18 of imaging member 10, may comprise any of the image-forming materials described above, or any other thermally-activated colorants, and are typically from about 0.5 to about 4 micrometers in thickness, preferably about 2 micrometers. In the case where the image-forming layers comprise more than one layer, as described above, each of the constituent layers is typically from about 0.1 to about 3 micrometers in thickness. The image-forming layers may comprise dispersions of solid materials, encapsulated liquids, amorphous or solid materials or solutions of active materials in polymeric binders, or any combinations of the above.

The distance from the outer surface of the imaging member, e.g., overcoat layer 24, to the interface between the first image-forming layer, e.g., image-forming layer 14, and a spacer layer, e.g., layer 20, is preferably between about 2 and 5 micrometers; the distance from the outer surface of the imaging member to the interface between a second image-forming layer, e.g., image-forming layer 16 and a spacer layer, e.g., spacer layer 22, is preferably between about 7 and about 12 micrometers, and the distance between the outer surface of the imaging member and the interface between the third image-forming layer, e.g., image-forming layer 18 and a substrate, e.g., substrate 12 is preferably at least about 28 micrometers.

Spacer layers, such as spacer layers 20 and 22, function as thermally insulating layers, and may comprise any suitable material. Typical suitable materials include water-soluble polymers such as poly(vinyl alcohol) or waterborne latex materials such as acrylates or polyurethanes. In addition, spacer layers 20 and 22 may comprise inorganic fillers such as for example calcium carbonate, calcium sulfate, silica or barium sulfate; ultraviolet absorbers such as zinc oxide, titanium dioxide, or organic materials such as benzotriazoles; materials that change phase such as organic crystalline compounds; and so on. In some embodiments, spacer layers may be solvent-soluble polymers such as for example poly(ethyl methacrylate). As mentioned above, if two spacer layers in an imaging member, e.g., spacer layers 20 and 22 comprise materials of substantially the same thermal diffusivity, preferably the spacer layer closer to the surface of the imaging member that is contacted by the thermal printing head, e.g., spacer layer 20, is thinner than the spacer layer remote from the contact surface, e.g., spacer layer 22. In a preferred embodiment, the thinner spacer layer is about 3.5 micrometers thick, and the thicker spacer layer is about 20 micrometers thick.

Spacer layers may be coated from water or an organic solvent, or may be applied as a laminated film. They may be opaque or transparent. In cases where one of the spacer layers, e.g., layers 20 and 22, is opaque, the substrate, e.g., substrate 12, is preferably transparent. In a preferred embodiment, the substrate is opaque and both spacer layers are transparent.

The thermal imaging members utilized in the method of the invention may also comprise an overcoat layer. The overcoat layer may comprise more than one layer. The function of the overcoat includes providing a thermally-resistant surface that is in contact with the thermal printing head, providing gas barrier properties and ultraviolet absorption to protect the image, and providing a suitable surface (for example, matte or glossy) for the surface of the image. Preferably, the overcoat layer is not more than 2 micrometers in thickness.

Alternatively, rather than coating overcoat 24, image-forming layer 14 can be coated onto a thin substrate such as poly(ethylene terephthalate) of less than about 4.5 micrometers in thickness. This structure may be laminated onto the remaining layers of the imaging member. Any combination of coating and lamination may be used to build up the structure of imaging member 10.

A particularly preferred thermal imaging member according to the present invention is constructed as follows.

The substrate is a filled, white poly(ethylene terephthalate) base of thickness about 75 microns, Melinex 339, available from Dupont Teijin Films, Hopewell, Va.

A first layer deposited on the substrate is an optional oxygen barrier layer composed of a fully hydrolyzed poly(vinyl alcohol), for example, Celvol 325, available from Celanese, Dallas, Tex. (96.7% by weight), glyoxal (a crosslinker, 3% by weight) and Zonyl FSN (a coating aid, available from Dupont, Wilmington, Del., 0.3% by weight). This layer, when present, has a coverage of about 1.0 g/m$^2$.

Deposited either directly onto the substrate, or onto the optional oxygen barrier layer, is a cyan image-forming layer composed of a cyan color-former having melting point 210° C., of the type disclosed in the aforementioned U.S. Pat. No. 7,008,759 (1 part by weight), diphenyl sulfone (a thermal solvent having melting point 125° C., coated as an aqueous dispersion of crystals having average particle size under 1 micron, 3.4 parts by weight), Lowinox WSP (a phenolic antioxidant, available from Great Lakes Chemical Co., West Lafayette, Ind., coated as an aqueous dispersion of crystals having average particle size under 1 micron, 0.75 parts by weight), Chinox 1790 (a second phenolic antioxidant, available from Chitec Chemical, Taiwan, coated as an aqueous dispersion of crystals having average particle size under 1 micron, 1 part by weight), poly(vinyl alcohol) (a binder, Celvol 205, available from Celanese, Dallas, Tex., 2.7 parts by weight), glyoxal (0.084 parts by weight) and Zonyl FSN (0.048 parts by weight). This layer has a coverage of about 2.5 g/m$^2$.

Deposited onto the cyan color-forming layer is a barrier layer that contains a fluorescent brightener. This layer is composed of a fully hydrolyzed poly(vinyl alcohol), for example, the abovementioned Celvol 325, available from Celanese, Dallas, Tex. (3.75 parts by weight), glyoxal (0.08 parts by weight), Leucophor BCF P115 (a fluorescent brightener, available from Clariant Corp., Charlotte, N.C., 0.5 parts by weight), boric acid (0.38 parts by weight) and Zonyl FSN (0.05 parts by weight). This layer has a coverage of about 1.5 g/m$^2$.

Deposited on the barrier layer is a thermally-insulating interlayer composed of Glascol C-44 (a latex available from Ciba Specialty Chemicals Corporation, Tarrytown, N.Y., 18 parts by weight), Joncryl 1601 (a latex available from Johnson Polymer, Sturtevant, Wis., 12 parts by weight) and Zonyl FSN (0.02 parts by weight). This layer has a coverage of about 13 g/m$^2$.

Deposited on the thermally-insulating interlayer is a barrier layer composed of a fully hydrolyzed poly(vinyl alcohol), for example, the abovementioned Celvol 325, available from Celanese, Dallas, Tex. (2.47 parts by weight), glyoxal (0.07 parts by weight), boric acid (0.25 parts by weight) and Zonyl FSN (0.06 parts by weight). This layer has a coverage of about 1.0 g/m$^2$.

Deposited on the barrier layer is a magenta color-forming layer, composed of a magenta color-former having melting point 155° C., of the type disclosed in U.S. patent application Ser. No. 10/788,963, filed Feb. 27, 2004, United States Patent Application Publication No. US2004/0191668 A1 (1.19 parts by weight); a phenolic antioxidant (Anox 29, having melting point 161-164° C., available from Great Lakes Chemical Co., West Lafayette, Ind., coated as an aqueous dispersion of crystals having average particle size under 1 micron, 3.58 parts by weight), Lowinox CA22 (a second phenolic antioxidant, available from Great Lakes Chemical Co., West Lafayette, Ind., coated as an aqueous dispersion of crystals having average particle size under 1 micron, 0.72 parts by weight), poly(vinyl alcohol) (a binder, Celvol 205, available from Celanese, Dallas, Tex., 2 parts by weight), the potassium salt of Carboset 325 (an acrylic copolymer, available from Noveon, Cleveland, Ohio, 1 part by weight) glyoxal (0.06 parts by weight) and Zonyl FSN (0.06 parts by weight). This layer has a coverage of about 2.7 g/m$^2$.

Deposited on the magenta color-forming layer is a barrier layer composed of a fully hydrolyzed poly(vinyl alcohol), for example, the abovementioned Celvol 325, available from Celanese, Dallas, Tex. (2.47 parts by weight), glyoxal (0.07 parts by weight), boric acid (0.25 parts by weight) and Zonyl FSN (0.06 parts by weight). This layer has a coverage of about 1.0 g/m$^2$.

Deposited on the barrier layer is a second thermally-insulating interlayer composed of Glascol C-44 (1 part by weight), Joncryl 1601 (a latex available from Johnson Polymer, 0.67 parts by weight) and Zonyl FSN (0.004 parts by weight). This layer has a coverage of about 2.5 g/m$^2$.

Deposited on the second interlayer is a yellow color-forming layer composed of Dye XI (having melting point 202-203° C.) described in U.S. patent application Ser. No. 10/789,566, filed Feb. 27, 2004, United States Patent Application Publication No. US2004/0204317 A1 (4.57 parts by weight), poly(vinyl alcohol) (a binder, Celvol 540, available from Celanese, Dallas, Tex., 1.98 parts by weight), a colloidal silica (Snowtex 0-40, available from Nissan Chemical Industries, Ltd Tokoyo, Japan, 0.1 parts by weight), glyoxal (0.06 parts by weight) and Zonyl FSN (0.017 parts by weight). This layer has a coverage of about 1.6 g/m$^2$.

Deposited on the yellow color-forming layer is a barrier layer composed of a fully hydrolyzed poly(vinyl alcohol), for example, the abovementioned Celvol 325, available from Celanese, Dallas, Tex. (1 part by weight), glyoxal (0.03 parts by weight), boric acid (0.1 parts by weight) and Zonyl FSN (0.037 parts by weight). This layer has a coverage of about 0.5 g/m$^2$.

Deposited on the barrier layer is an ultra-violet blocking layer composed of a nanoparticulate grade of titanium dioxide (MS-7, available from Kobo Products Inc., South Plainfield, N.J., 1 part by weight), poly(vinyl alcohol) (a binder, Elvanol 40-16, available from DuPont, Wilmington, Del., 0.4 parts by weight), Curesan 199 (a crosslinker, available from BASF Corp., Appleton, Wis., 0.16 parts by weight) and Zonyl FSN (0.027 parts by weight). This layer has a coverage of about 1.56 g/m$^2$.

Deposited on the ultra-violet blocking layer is an overcoat composed of a latex (XK-101, available from NeoResins, Inc., Wilmingtom, Mass., 1 part by weight), a styrene/maleic acid copolymer (SMA 17352H, available from Sartomér Company, Wilmington, Pa., 0.17 parts by weight), a crosslinker (Bayhydur VPLS 2336, available from BayerMaterialScience, Pittsburgh, Pa., 1 part by weight), zinc stearate (Hidorin F-115P, available from Cytech Products Inc., Elizabethtown, Ky., 0.66 parts by weight) and Zonyl FSN (0.04 parts by weight). This layer has a coverage of about 0.75 g/m$^2$.

Optimal conditions for printing a yellow image using the preferred thermal imaging member described above are as follows. Thermal printing head parameters:

Pixels per inch: 300

Resistor size: 2×(31.5×120) microns

Resistance: 3000 Ohm

Glaze Thickness: 110 microns

Pressure: 3 lb/linear inch

Dot pattern: Slanted grid.

The yellow color-forming layer is printed as shown in the table below. The line cycle time is divided into individual pulses of 75% duty cycle. The thermal imaging member is preheated by contact with the thermal printing head glaze at the heat sink temperature over a distance of about 0.3 mm.

| | Yellow printing |
|---|---|
| Heat sink temperature | 25° C. |
| Dpi (transport direction) | 300 |
| Voltage | 38 |
| Line speed | 6 inch/sec |
| Pulse interval | 12.5 microsec |
| # pulses used | 8-17 |

Optimal conditions for printing a magenta image using the preferred thermal imaging member described above are as follows. Thermal printing head parameters:

Pixels per inch: 300

Resistor size: 2×(31.5×120) microns

Resistance: 3000 Ohm

Glaze Thickness: 200 microns

Pressure: 3 lb/linear inch

Dot pattern: Slanted grid.

The magenta color-forming layer is printed as shown in the table below. The line cycle time is divided into individual pulses of 7.14% duty cycle. The thermal imaging member is preheated by contact with the thermal printing head glaze at the heat sink temperature over a distance of about 0.3 mm.

| | Magenta printing |
|---|---|
| Heat sink temperature | 30° C. |
| Dpi (transport direction) | 300 |
| Voltage | 38 |
| Line speed | 0.75 inch/sec |
| Pulse interval | 131 microsec |
| # pulses used | 20-30 |

Optimal conditions for printing a cyan image using the preferred thermal imaging member described above are as follows. Thermal printing head parameters:

Pixels per inch: 300

Resistor size: 2×(31.5×180) microns

Resistance: 3000 Ohm

Glaze Thickness: 200 microns

Pressure: 3 lb/linear inch

Dot pattern: Slanted grid.

The cyan color-forming layer is printed as shown in the table below. The line cycle time is divided into individual pulses of about 4.5% duty cycle. The thermal imaging member is preheated by contact with the thermal printing head glaze at the heat sink temperature over a distance of about 0.3 mm.

| | Cyan printing |
|---|---|
| Heat sink temperature | 50° C. |
| Dpi (transport direction) | 300 |
| Voltage | 38 |
| Line speed | 0.2 inch/sec |
| Pulse interval | 280 microsec |
| # pulses used | 33-42 |

EXAMPLES

The thermal imaging method of the invention will now be described further with respect to a specific preferred embodiment by way of an example, it being understood that this is intended to be illustrative only and the invention is not limited to the materials, amounts, procedures and process parameters, etc. recited therein. All parts and percentages are by weight unless otherwise specified.

The thermal imaging member used in all the Examples below was prepared as follows.

The following materials were used in preparation of the thermal imaging member:

Celvol 205, a grade of poly(vinyl alcohol) available from Celanese, Dallas, Tex.;

Celvol 325, a grade of poly(vinyl alcohol) available from Celanese, Dallas, Tex.;

Celvol 540, a grade of poly(vinyl alcohol) available from Celanese, Dallas, Tex.;

NeoCryl A-639, available from NeoResins, Inc., Wilmingtom, Mass.;

Glascol TA, a polyacrylamide available from Ciba Specialty Chemicals Corporation, Tarrytown, N.Y.;

Zonyl FSN, a surfactant, available from DuPont Corporation, Wilmington, Del.;

Pluronic 25R4, a surfactant available from BASF, Florham Park, N.J.;

Surfynol CT-111, a surfactant available from Air Products and Chemicals, Inc., Allentown, Pa.;

Surfynol CT-131, a surfactant available from Air Products and Chemicals, Inc., Allentown, Pa.;

Tamol 731, a surfactant available from ROHM and HAAS Co. Philadelphia, Pa.;

Triton X-100, a surfactant available from The Dow Chemical Company, Midland, Mich.;

Hidorin F-115P, a grade of zinc stearate available from Cytech Products Inc., Elizabethtown, Ky.;

Nalco 30V-25, a silica dispersion available from ONDEO Nalco Company, Chicago, Ill.;

RPVC 0.008, a white rigid poly(vinyl chloride) film base of approximately 8 mils in thickness, available from Tekra Corporation, New Berlin, Wis.;

Yellow Color Former: Dye IV (having melting point 105-107° C.) described in U.S. patent application Ser. No. 10/789,566, filed Feb. 27, 2004, United States Patent Application Publication No. US2004/0204317 A1;

Magenta Color Former: a color-former having melting point 155° C., of the type disclosed in U.S. patent application Ser. No. 10/788,963, filed Feb. 27, 2004, United States Patent Application Publication No. US2004/0191668 A1; a thermal solvent, Anox 29, having melting point 161-164° C., available from Great Lakes Chemical Co., West Lafayette, Ind., was used in conjunction with the magenta color former.

Cyan Color Former: a color-former having melting point 210° C., of the type disclosed in the aforementioned U.S. patent application Ser. No. 10/788,963.

The imaging member was prepared by successive coatings applied to the substrate, which was RPVC 0.008.

A yellow image-forming layer was applied as follows:

Yellow Color Former (10 g) was dispersed in a mixture comprising Celvol 205 (6.3 g of a 17.6% solution in water), methyl acetate (4 g) and water (43.7 g), using an attritor equipped with glass beads, stirred for 24 hours at room temperature. The total solid content of the resulting dispersion was 18%.

The above dispersion was combined with water and the materials listed in the table below to make the coating fluid for the yellow dye-forming layer in proportions stated. The coating composition thus prepared was coated onto RPVC 0.008 for a dried thickness of 1.9 microns.

| Ingredient | % solids in coating fluid |
|---|---|
| Yellow Color Former dispersion solids | 5.33 |
| Celvol 205 | 0.27 |
| Zinc sulfate | 2.65 |
| Zonyl FSN | 0.09 |

An interlayer was next applied as follows:

Water was combined with the materials listed in the table below to provide a coating fluid, which was coated onto the yellow image-forming layer for a dried thickness of 18 microns.

| Ingredient | % solids in coating fluid |
|---|---|
| NeoCryl A-639 | 6.27 |
| Celvol 325 | 4.68 |
| Zonyl FSN | 0.09 |

A magenta image-forming layer was applied as follows:

Magenta Color Former (587.50 g) was dispersed in a mixture comprising Surfynol CT-111 (26.88 g of a 83% solution in water), Surfynol CT-131 (20.43 g of a 52% solution in water), methyl acetate (375 g) and water (1490.19 g), using an attritor equipped with glass beads, stirred for 21.5 hours at room temperature. The total solid content of the resulting dispersion was 14.03%.

The thermal solvent (510 g) having melting point 165° C. was dispersed in a mixture comprising Tamol 731 (437.32 g of a 6.86% solution in water, adjusted with sulfuric acid to a pH of 6.7-6.8), Celvol 205 (340.91 g of a 17.6% solution in water), and water (711.77 g), using an attritor equipped with glass beads, stirred for 18.5 hours at room temperature. The total solid content of the resulting dispersion was 23.29%.

The above dispersions were combined with water and the materials listed in the table below to make the coating fluid for the magenta dye-forming layer in proportions stated. The coating composition thus prepared was coated onto the interlayer prepared as described above for a dried thickness of 1.9 microns.

| Ingredient | % solids in coating fluid |
|---|---|
| Magenta Color Former dispersion solids | 1.67 |
| Thermal solvent dispersion solids | 5.07 |
| Celvol 205 | 1.67 |
| Zonyl FSN | 0.08 |

A second interlayer was applied as follows:

Water was combined with the materials listed in the table below to provide a coating fluid, which was coated onto the magenta image-forming layer for a dried thickness of 3.5 microns.

| Ingredient | % solids in coating fluid |
|---|---|
| Copolymer of acrylate, styrene and acrylic acid | 7.29 |
| Celvol 540 | 0.55 |
| Glascol TA | 0.15 |
| Zonyl FSN | 0.06 |

A cyan image-forming layer was prepared as follows:

Cyan Color Former (705.0 g, melting point 207-210 C) was dispersed in a mixture comprising Surfynol CT-131 (14.42 g of a 52% solution in water), Pluronic 25R4 (18.75 g of 100% active), Triton X-100 (18.75 g of 100% active) methyl acetate (437.5 g) and water (1312.5 g), using an attritor equipped with glass beads, stirred for 18.5 hours at room temperature. The total solid content of the resulting dispersion was 26.98%.

The above dispersion was combined with water and the materials listed in the table below to make the coating fluid for the cyan dye-forming layer in proportions stated. The coating composition thus prepared was coated onto the second interlayer prepared as described above for a dried thickness of 2.0 microns.

| Ingredient | % solids in coating fluid |
|---|---|
| Cyan Color dispersion solids | 3.8 |
| Celvol 205 | 2.54 |
| Zonyl FSN | 0.08 |

An overcoat was applied as follows:

Water was combined with the materials listed in the table below to provide a coating fluid, which was coated onto the cyan image-forming layer for a dried thickness of 0.76 microns.

| Ingredient | % solids in coating fluid |
|---|---|
| Hidorin F-115P | 0.63 |
| Celvol 540 | 1.27 |
| Nalco 30V-25 | 1.04 |
| Zonyl FSN | 0.09 |

In Examples I, II and III below, the following printing parameters were used:

Printing head: Toshiba F3788B, available from Toshiba Hokuto Electronics Corporation Printing head width: 115 mm, 108.4 printing width Pixels per inch: 300

Resistor size: 2×(31.5×120) microns

Resistance: 1835 Ohm

Glaze Thickness: 65 microns

Pressure: 1.5-2 lb/linear inch

Dot pattern: Rectangular grid.

Example I

This comparative example illustrates printing of the thermal imaging member prepared as described above in three printing passes, each at the same speed, and each having the same amount of preheating.

All three colors were printed at a resolution in the direction of transport and a line cycle time as shown in the table below. The line cycle time was divided into individual pulses of 95% duty cycle. Each color was printed in a separate pass using the voltage and the number of pulses shown in the table. The thermal imaging member was preheated by contact with material at the heat sink temperature over a distance of about 0.3 mm. Ten areas of the imaging member were printed for each color, ranging from Dmin (using the lowest number of pulses in the indicated range) for Dmax (using the maximum number of pulses in the indicated range.

| | Cyan | Magenta | Yellow |
|---|---|---|---|
| Heat sink temperature | 49° C. | 49° C. | 49° C. |
| Dpi (transport direction) | 600 | 600 | 600 |
| Voltage | 32.5 | 13.74 | 8.75 |
| Line cycle time | 8 ms | 8 ms | 8 ms |
| # pulses/line | 715 | 715 | 715 |
| # pulses used | 19-39 | 206-274 | 550-715 |

Figure 7:
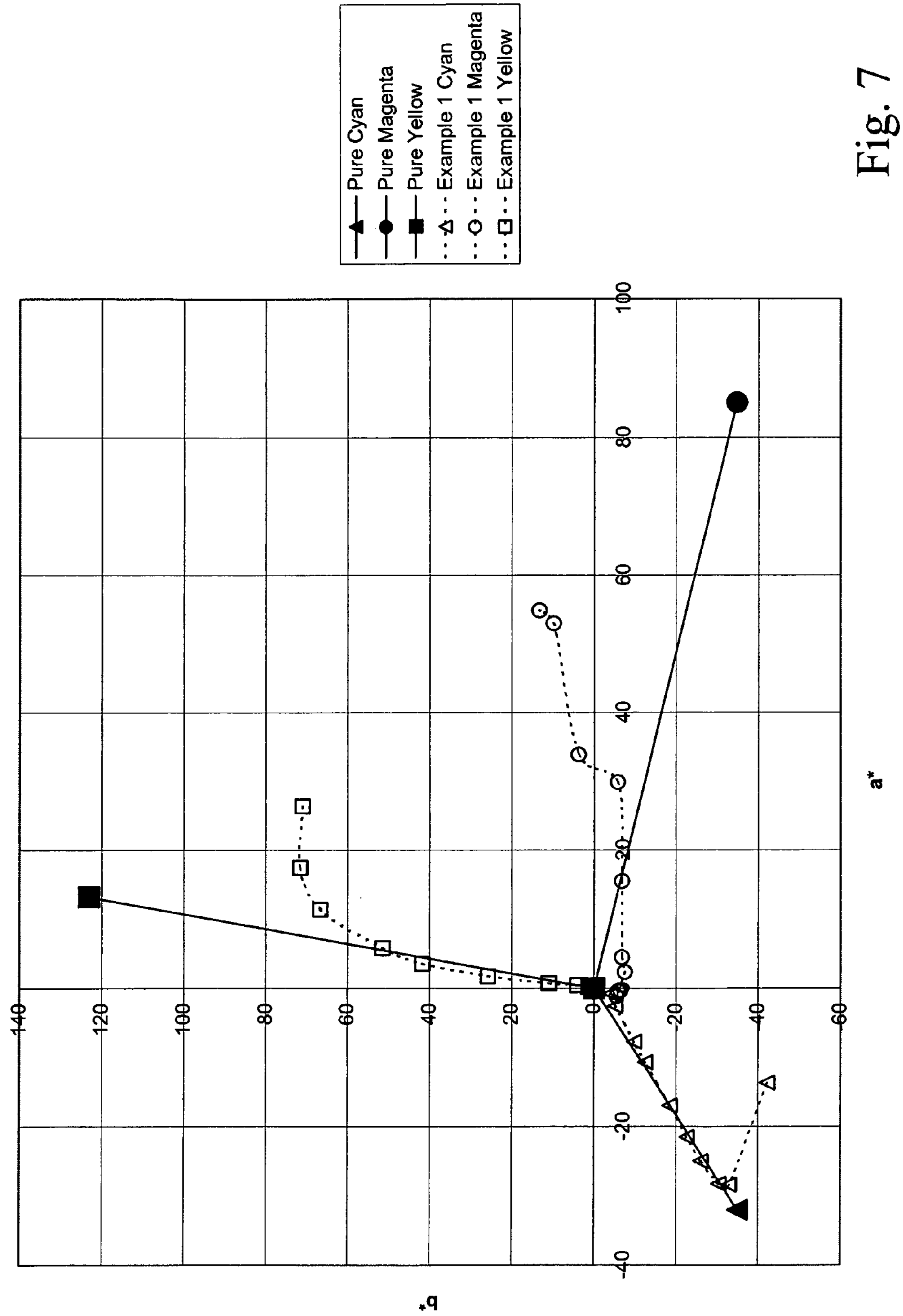
FIG. 7 is a chart showing the color gamut available with a thermal imaging member which can be used in the present invention, but printed at a constant speed.

Each colored patch was measured using a Gretag SPM50 densitometer manufactured by Gretag Ltd., Switzerland. The measurement conditions were: illumination=D50; observer angle=2°; density standard=DIN; calibrated against white base, without filter. The CIELab colors associated with each patch are shown in FIG. 7, in which only a* and b* values are shown. Also shown in FIG. 7 are the a* and b* values of the pure color formers at a reflection optical density of approximately 2.0.

It can be seen from FIG. 7 that using the method of this example, all three subtractive primary colors may be printed onto the thermal imaging member. The total time required was 8 milliseconds per line at 600 dot/inch resolution for each color. Thus, to print 1 inch would require at least 3 (colors)×0.008(seconds/line)×600(lines/inch)=14.4 seconds.

Example II

This example illustrates a method of the present invention, in which the thermal imaging member prepared as described above was imaged in three printing passes, each at a different speed, and each having the same temperature of the preheating element.

All three colors were printed in separate passes as indicated in the table below. The line cycle time was divided into individual pulses of 95% duty cycle. The thermal imaging member was preheated by contact with material at the heat sink temperature over a distance of about 0.3 mm. Ten areas of the imaging member were printed for each color, ranging from Dmin (using the lowest number of pulses in the indicated range) for Dmax (using the maximum number of pulses in the indicated range).

| | Cyan | Magenta | Yellow |
|---|---|---|---|
| Heat sink temperature | 60° C. | 60° C. | 60° C. |
| Dpi (transport direction) | 300 | 300 | 300 |
| Voltage | 32 | 12.5 | 8.9 |
| Line cycle time | 3 ms | 3.5 ms | 11 ms |
| # pulses/line | 267 | 312 | 984 |
| # pulses used | 15-35 | 200-312 | 600-984 |

Figure 8:
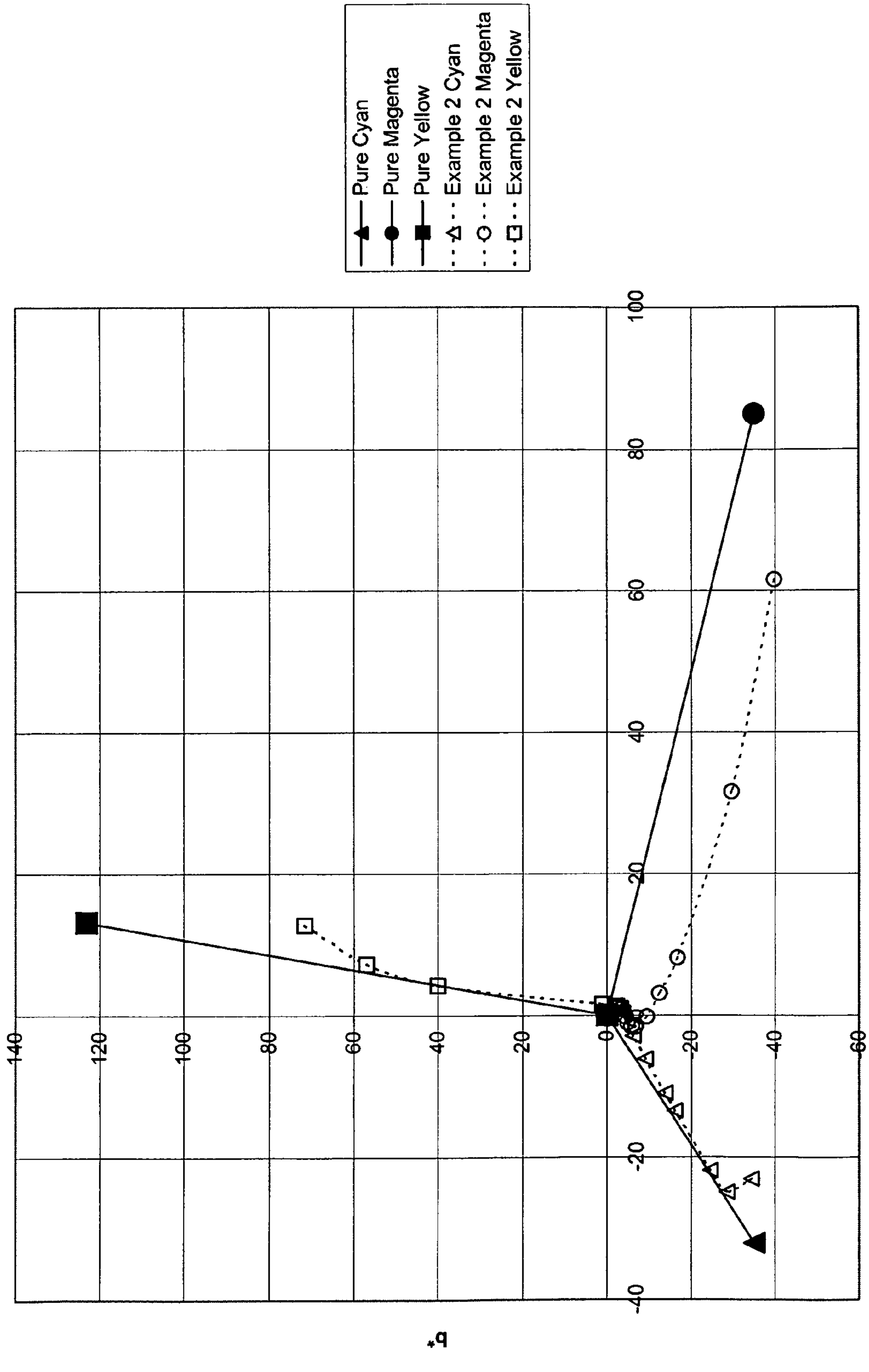
FIG. 8 is a chart showing the color gamut available with a preferred embodiment of the invention.

Each colored patch was measured as described in Example 1 above. The CIELab colors associated with each patch are shown in FIG. 8, in which only a* and b* values are shown. Also shown in FIG. 8 are the a* and b* values of the pure color formers at a reflection optical density of approximately 2.0.

It can be seen from FIG. 8 that using the method of this example, all three subtractive primary colors may be printed onto the thermal imaging member. The total time required was 3 milliseconds per line at 300 dot/inch resolution for cyan, 3.5 milliseconds per line at 300 dot/inch resolution for magenta, and 11 milliseconds per line at 300 dot/inch resolution for yellow. Thus, to print 1 inch would require at least [0.003 (seconds/line)+0.0035 (seconds/line)+0.011(seconds/line)]×300 (lines/inch)=5.25 seconds.

It can be seen that the time required to form an image in the imaging member according to method of the invention was reduced significantly, even though the slowest pass (in which the yellow image was formed) was slower than the corresponding yellow printing pass in Example I above. Comparison of FIGS. 7 and 8 also reveals that the quality of the magenta image was significant superior in the method of the present invention (FIG. 8) than in the method of Example I (FIG. 7). In particular, there is less contamination of the magenta image with yellow. This is attributable to reduced preheating of the yellow image-forming layer by the thermal printing head glaze when magenta is printed relatively quickly.

Example III

This Example illustrates a method of the present invention, in which the thermal imaging member prepared as described above was imaged in three printing passes, each at a different speed, one of which had a different amount of preheating from the other two.

All three colors were printed in separate passes as indicated in the table below. The line cycle time was divided into individual pulses of 95% duty cycle. The thermal imaging member was preheated by contact with material at the heat sink temperature over a distance of about 0.3 mm. Ten areas of the imaging member were printed for each color, ranging from Dmin (using the lowest number of pulses in the indicated range) for Dmax (using the maximum number of pulses in the indicated range).

| | Cyan | Magenta | Yellow |
|---|---|---|---|
| Heat sink temperature | 26° C. | 27° C. | 52° C. |
| Dpi (transport direction) | 600 | 300 | 600 |
| Voltage | 34 | 12.56 | 8.25 |
| Line cycle time | 8 ms | 5.5 ms | 11 ms |
| # pulses/line | 715 | 492 | 984 |
| # pulses used | 18-38 | 350-492 | 700-984 |

Figure 9:
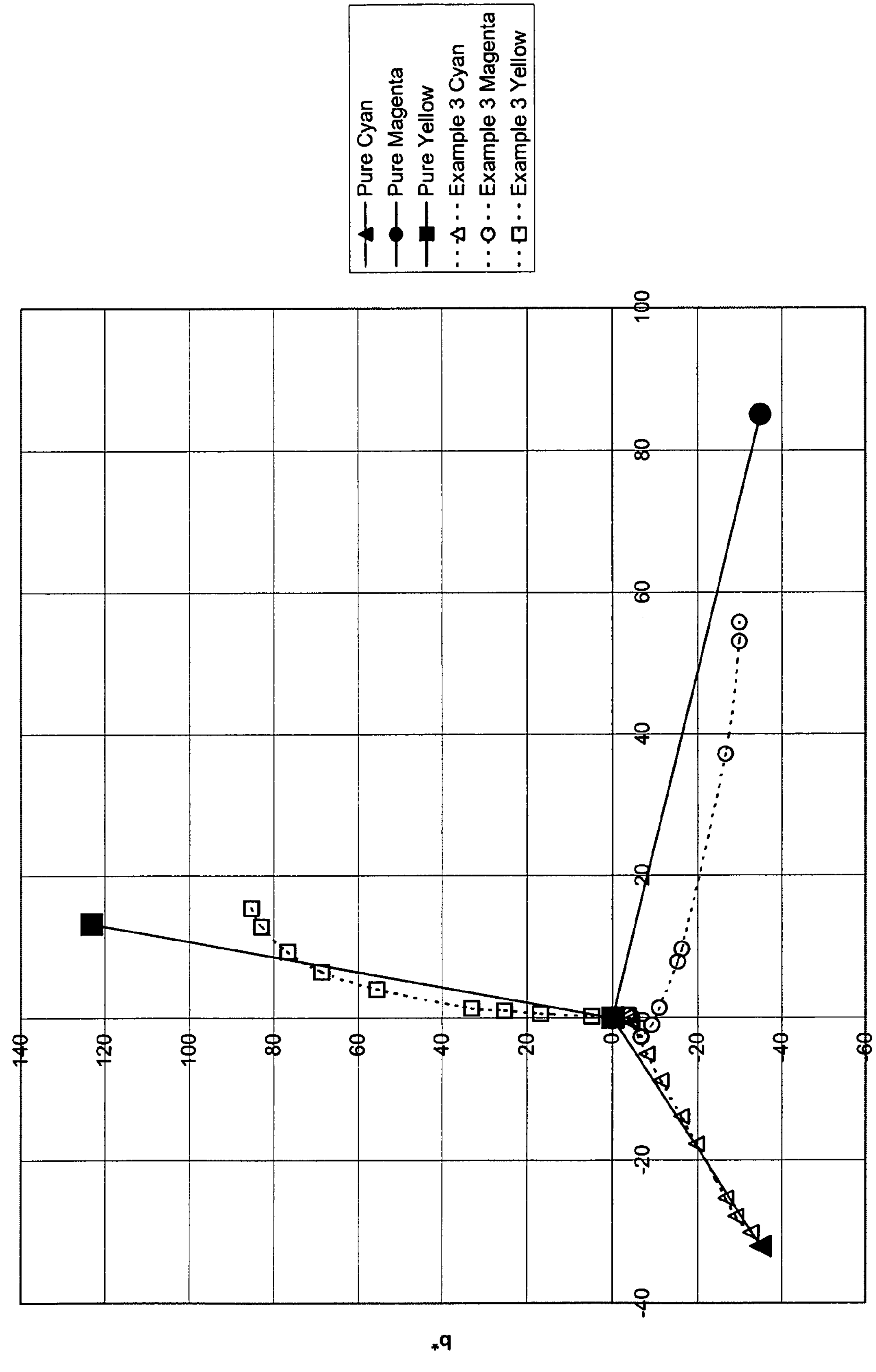
FIG. 9 is a chart showing the color gamut available with another preferred embodiment of the invention.
Figure 10:
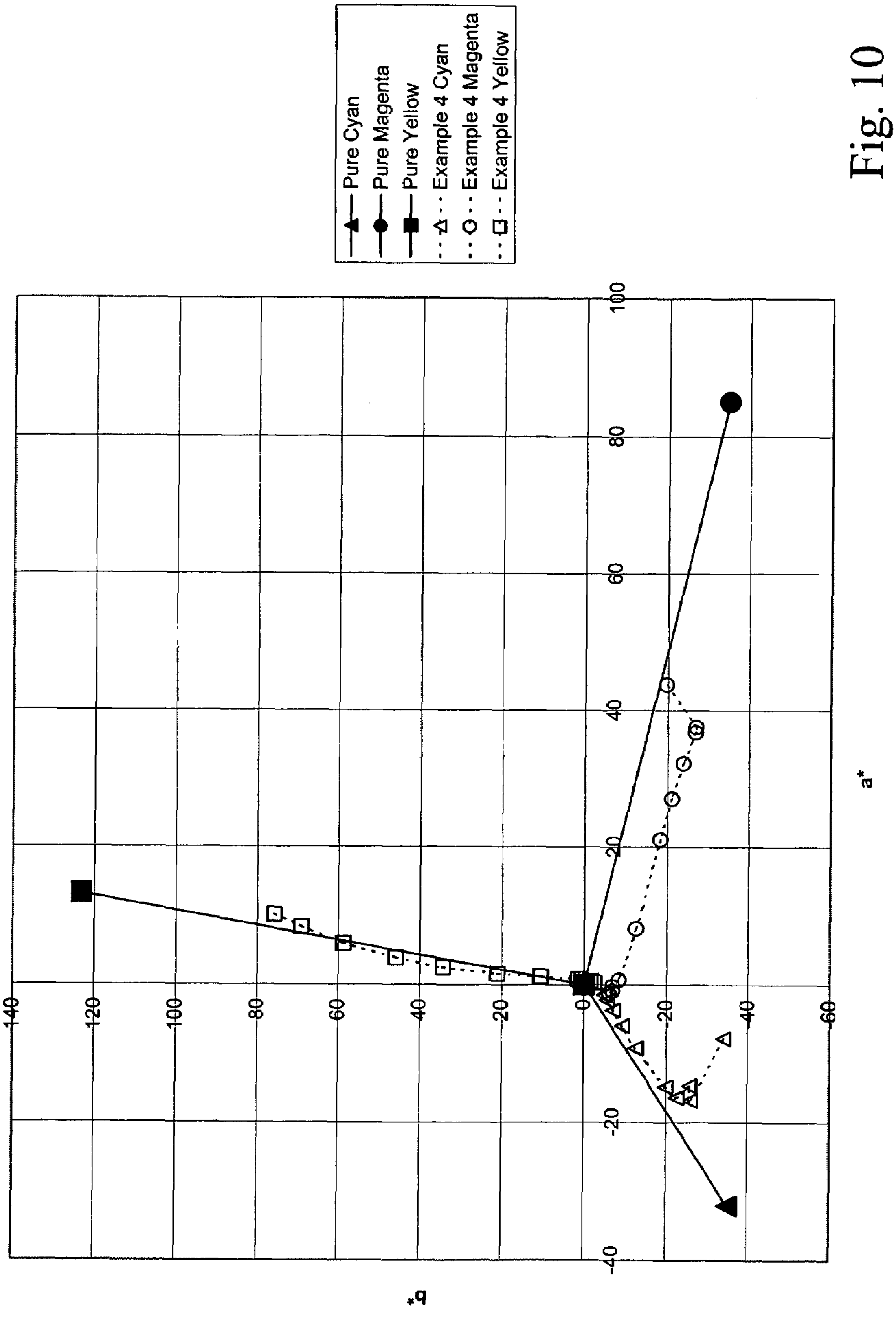
FIG. 10 is a chart showing the color gamut available with still another preferred embodiment of the invention.

Each colored patch was measured as described in Example 1 above. The CIELab colors associated with each patch are shown in FIG. 9, in which only a* and b* values are shown. Also shown in FIG. 9 are the a* and b* values of the pure color formers at a reflection optical density of approximately 2.0.

It can be seen from FIG. 9 that using the method of this example, all three subtractive primary colors may be printed onto the thermal imaging member. The color gamut available is larger than that of the methods of Examples I and II. The total time required was 8 milliseconds per line at 600 dot/inch resolution for cyan, 5.5 milliseconds per line at 300 dot/inch resolution for magenta, and 11 milliseconds per line at 600 dot/inch resolution for yellow. Thus, to print 1 inch would require at least [0.008 (seconds/line+0.0055/2(seconds/line)+0.011 (seconds/line))×600 (lines/inch)=13.05 seconds. While this printing time is not substantially shorter than that of Example I, the color gamut available is greater.

In Example IV the following printing parameters were used:

Printing head: KYT106-12PAN13 (Kyocera Corporation, 6 Takedatobadono-cho, Fushimi-ku, Kyoto, Japan)

Printing head width: 3.41 inch (106 mm print line width)

Pixels per inch: 300

Resistor size: 70×80 microns

Resistance: 3059 Ohm

Glaze thickness: 55 microns

Pressure: 1.5-2 lb/linear inch

Dot pattern: Rectangular grid.

Example IV

This Example illustrates a method of the present invention, in which the thermal imaging member prepared as described above was imaged in two printing passes, each at a different speed. In both printing passes the color-forming layers were addressed with a heat sink temperature of approximately 60° C.

All three colors were printed at 400 dpi in the transport direction. A voltage of 34 V was applied to the thermal printing head. Cyan and magenta were printed in a single pass with a line time of 4.2 milliseconds. This line cycle time was divided into 250 individual pulses of varying duty cycle depending on which of the cyan and magenta image-forming layers was being addressed as indicated in the table below. The yellow layer was printed with a line time of 16.7 milliseconds. The thermal imaging member was preheated by contact with material at the heat sink temperature of 58° C. over a distance of about 0.3 mm. Ten areas of the imaging member were printed for each color, ranging from Dmin (using the lowest number of pulses in the indicated range) to Dmax (using the maximum number of pulses in the indicated range).

| | Cyan | Magenta | Yellow |
|---|---|---|---|
| Duty cycle | 74% | 18% | 6.1% |
| Line cycle time | 4.2 ms | | 16.7 ms |
| # pulses/line | 250 | | 1001 |
| # pulses used | 12~25 | 80~130 | 440~872 |

Each colored patch was measured as described in Example 1 above. The CIELab colors associated with each patch are shown in FIG. 9, in which only a* and b* values are shown. Also shown in FIG. 9 are the a* and b* values of the pure color formers at a reflection optical density of approximately 2.0.

It can be seen from FIG. 9 that using the method of this example, all three subtractive primary colors may be printed onto the thermal imaging member. The total time required was 4.2 milliseconds per line at 400 dot/inch resolution for cyan and magenta, and 16.7 milliseconds per line at 400 dot/inch resolution for yellow. Thus, to print 1 inch would require at least [4.2 (seconds/line)+16.7 (seconds/line)]×400 (lines/inch)=8.08 seconds. This is a substantially shorter time than the 14.4 seconds of Example I.

Although the invention has been described in detail with respect to various preferred embodiments, it is not intended to be limited thereto, but rather those skilled in the art will recognize that variations and modifications are possible which are within the spirit of the invention and the scope of the appended claims.

We claim:

1. A multicolor thermal imaging method comprising:

(a) providing a thermal imaging member comprising at least a first image-forming layer forming a first color when heated and a second image-forming layer forming a second color when heated, said first and second colors being different from each other;

(b) applying heat to form an image in said first color at a first speed of travel of said thermal imaging member with respect to a source of said heat; and (c) applying heat to form an image in said second color at a second speed of travel of said thermal imaging member with respect to said source of said heat;

wherein said first speed of travel and said second speed of travel are substantially different speeds of travel;

whereby a multicolor image is formed in said thermal imaging member;

wherein at least one of said image-forming layers is at a first baseline temperature before applying heat to form an image in said first color and at a second baseline temperature before applying heat to form an image in said second color, wherein said first and second baseline temperatures differ by at least about 5° C.

2. The thermal imaging method as defined in claim 1 wherein said first speed of travel is greater than 0.5 inches/second and said second speed of travel is less than 0.5 inches/second.

3. The thermal imaging method as defined in claim 1 wherein said first speed of travel is greater than 0.7 inches/second and said second speed of travel is less than 0.3 inches/second.

4. The thermal imaging method a defined in claim 1 wherein said source of said beat comprises a thermal printing head.

5. The thermal imaging method as defined in claim 4 wherein a heat sink of said thermal printing head is maintained at an approximately constant temperature during steps (b) and (c).

6. The thermal imaging method as defined in claim 5 wherein said approximately constant temperature is at least about 5° C. above ambient temperature.

7. The thermal imaging method as defined in claim 5 wherein said approximately constant temperature is at least about 20° C. above ambient temperature.

8. The thermal imaging method as defined in claim 4 wherein the heat sink of said thermal printing head is maintained at a first temperature during step (b) and a second temperature during step (c), said first and said second temperatures differing by at least about 5° C.

9. The thermal imaging in method as defined in claim 1 wherein said source of said heat comprises a laser.

10. The thermal imaging method as defined in claim 1 wherein said source of said heat comprises more than one heating means.

11. The thermal imaging method as defined in claim 10 wherein said source of said heat comprises a first heating means capable of being modulated so as to form an image in said thermal imaging member and a second heating means capable of providing uniform preheating.

12. The thermal imaging method as defined in claim 11 wherein said first heating means and said second heating means make contact with different points on the same surface of said thermal imaging member at any given instant.

13. The thermal imaging method as defined in claim 12 wherein said second heating means is maintained at an approximately constant temperature during steps (b) and (c).

14. The thermal imaging method as defined in claim 13 wherein said approximately constant temperature is at least about 5° C. above ambient temperature.

15. The thermal imaging method as defined in claim 13 wherein said approximately constant temperature is at least about 20° C. above ambient temperature.

16. The thermal imaging method as defined in claim 12 wherein said second heating means is maintained at a first temperature during step (b) and at a second temperature during step (c), said first and said second temperatures differing by at least about 5° C.

17. The thermal imaging method as defined in claim 1 wherein said first image-forming layer has an activating temperature that is higher by at least about 5° C. than that of said second image-forming layer.

18. The thermal imaging method as defined in claim 17 wherein said first speed of travel is greater than said second speed of travel.

19. The thermal imaging method as defined in claim 1, wherein during formation of said images, said first image forming layer is positioned relatively further from said source of said heat than said second image forming layer, said first baseline temperature being relatively higher than said second baseline temperature.

20. A multicolor thermal imaging method comprising:

(a) providing a thermal imaging member comprising at least a first image-forming layer forming a first color when heated, a second image-forming layer forming a second color when heated, and a third image-forming layer forming a third color when heated, said first, second and third colors being different from each other;

(b) applying heat to form an image in said first color at a first speed of travel of said thermal imaging member with respect to a source of said heat;

(c) applying heat to form an image in said second color at a second speed of travel of said thermal imaging member with respect to said source of said heat; and (d) applying heat to form an image in said third color at a third speed of travel of said thermal imaging member with respect to said source of said heat;

wherein at least two of said first, second and third speeds of travel are substantially different speeds of travel;

whereby a multicolor image is formed in said thermal imaging member;

wherein at least one of said image-forming layers is at a first baseline temperature before applying heat to form an image in at least one of said first, second and third colors and at a second baseline temperature before applying heat to form an image in at least another of said first, second and third colors, said first and said second baseline temperatures differing by at least about 5° C.

21. The thermal imaging method as defined in claim 20 wherein two of said first, second and third speeds of travel are the same.

22. The thermal imaging method as defined in claim 21 wherein an image is formed in at least two of said colors in one pass of said thermal imaging member relative to said source of said heat and an image is formed in at least a third of said colors in another pass of said thermal imaging member relative to said source of said heat.

23. The thermal imaging method as defined in claim 20 wherein each of said first, second and third speeds of travel are substantially different speeds of travel.

24. The thermal imaging method as defined in claim 20 wherein said source of said heat comprises a thermal printing head.

25. The thermal imaging method as defined in claim 24 wherein an image is formed in at least two of said image-forming layers in one printing pass of said thermal printing head and an image is formed in at least a third of said image-forming layers in another printing pass of said thermal printing head, wherein the speeds of travel of said thermal imaging member with respect to said thermal printing head in said printing passes are substantially different speeds of travel.

26. The thermal imaging method as defined in claim 25 wherein a heat sink of said thermal printing head is maintained at a first temperature during one printing pass and a second temperature during the other printing pass, wherein said first temperature differs from said second temperature by at least about 5° C.

27. The thermal imaging method as defined in claim 25 wherein a heat sink of said thermal printing head is maintained at a first temperature during one printing pass and a second temperature during the other printing pass, wherein said first temperature differs from said second temperature by less than about 5° C.

28. The thermal imaging method as defined in claim 24 wherein an image is formed in one of said image-forming layers in a first printing pass of said thermal printing head, an image is formed in another of said image-forming layers in a second printing pass of said thermal printing head, and an image is formed in a third of said image-forming layers in a third printing pass of said thermal printing head, wherein the speeds of travel of said thermal imaging member with respect to said thermal printing head in at least two of said first, second and third printing passes are substantially different speeds of travel.

29. The thermal imaging method as defined in claim 28 wherein a heat sink of said thermal printing head is maintained at a first temperature during the first of said passes, a second temperature during the second of said passes, and a third temperature during the third of said passes, at least one of said first, second, and third temperatures differing from at least another of said first, second and third temperatures by at least about 5° C.

30. The thermal imaging method as defined in claim 20 wherein said source of said heat comprises more than one heating means.

31. The thermal imaging method as defined in claim 30 wherein said source of said heat comprises a first heating means capable of being modulated so as to form an image in aid thermal imaging member and a second heating means capable of providing uniform preheating.

32. The thermal imaging method as defined in claim 31 wherein said first heating means and said second heating means make contact with different points on the same surface of said thermal imaging member at any given instant.

33. The thermal imaging method as defined in claim 31 wherein an image is formed in at least two of said image-forming layers in one pass of said first and second heating means and an image is formed in at least a third of said image-forming layers in another pass of said first and second heating means the speeds of travel of said thermal imaging member with respect to said first and second heating means in said passes being substantially different speeds of travel.

34. The thermal imaging method as defined in claim 33 wherein said second heating means is maintained at a first temperature during one pass and at a second temperature during the other pass wherein said first temperature differs from said second temperature by at least about 5° C.

35. The thermal imaging method is defined in claim 33 wherein said second heating means is maintained at a first temperature during one pass and at a second temperature during the other pass, wherein said first temperature differs from said second temperature by at less than about 5° C.

36. The thermal imaging method as defined in claim 31 wherein an image is formed in one of said image-forming layers in a first pass of said first and second heating means, an image is formed in another of said image-forming layers in a second pass of said first and second heating means, and an image is form in a third of said image-forming layers in a third pass of said first and second heating means wherein the speeds of travel of said thermal imaging member with respect to said first and second heating means in at least two of said first, second and third printing passes, are substantially different speeds of travel.

37. The thermal imaging method as defined in claim 36 wherein said second heating means is maintained at a first temperature during the first of said passes, at a second temperature during the second of said passes, and at a third temperature during the third of said passes, wherein at least two of said first, second and third temperatures differ from each other by at least about 5° C.

38. The thermal imaging method as defined in claim 36 wherein said second heating means is maintained at a first temperature during the first of said passes, at a second temperature during the second of said passes and at a third temperature during the third of said passes, none said first, second and third temperatures differing from any other of said first, second and third temperatures by more than about 5° C.

39. The thermal imaging method as defined in claim 20 wherein said first image-forming layer has an activating temperature that is higher than that of said second image-forming layer, and said second image-forming layer has an activating temperature that is higher than that of said third image-forming layer.

40. The thermal imaging method as defined in claim 39 wherein said first speed of travel is greater than said second speed of travel, and said second speed of travel is greater than said third speed of travel.

* * * * *